(12) United States Patent
Stanton

(10) Patent No.: US 11,556,575 B2
(45) Date of Patent: *Jan. 17, 2023

(54) SYSTEM ANSWERING OF USER INPUTS

(71) Applicant: Amazon Technologies, Inc., Seattle, WA (US)

(72) Inventor: James Alexander Stanton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/196,028

(22) Filed: Mar. 9, 2021

(65) Prior Publication Data

US 2021/0248170 A1 Aug. 12, 2021

Related U.S. Application Data

(63) Continuation of application No. 16/014,524, filed on Jun. 21, 2018, now Pat. No. 10,956,462.

(51) Int. Cl.
*G06F 16/332* (2019.01)
*G10L 15/22* (2006.01)
*G10L 13/02* (2013.01)
*G06N 5/00* (2006.01)
*G10L 15/26* (2006.01)
*G06F 40/35* (2020.01)

(52) U.S. Cl.
CPC .......... *G06F 16/3329* (2019.01); *G06F 40/35* (2020.01); *G06N 5/00* (2013.01); *G10L 13/02* (2013.01); *G10L 15/22* (2013.01); *G10L 15/26* (2013.01)

(58) Field of Classification Search
CPC ...... G06F 16/3329; G06F 40/35; G06F 3/167; G06F 17/2735; G06F 17/278; G06N 5/00; G06N 20/00; G06N 5/02; G06N 5/04; G10L 13/02; G10L 15/22; G10L 15/26; G10L 15/193; G10L 15/08
See application file for complete search history.

(56) References Cited

U.S. PATENT DOCUMENTS 5,774,860 A * 6/1998 Bayya ..................... G10L 15/22
700/246
8,438,224 B1 * 5/2013 Chirita .................. H04L 67/306
709/204
9,047,868 B1 * 6/2015 O'Neill ................. G10L 15/197
(Continued)

*Primary Examiner* — Mohammad K Islam
(74) *Attorney, Agent, or Firm* — Pierce Atwood LLP

(57) ABSTRACT

Techniques for structuring knowledge bases specific to a user or group of users and techniques for using the knowledge bases to answer user inputs are described. A knowledge base may be populated with information provided by users associated with the knowledge base. Users associated with a knowledge base may be proactive in providing content to the knowledge base and/or a system may solicit an answer to a user input from users associated with a particular knowledge base. When the system receives an answer, the system may populate the knowledge base with the answer and may output the answer to the user that originated the user input. The system may output user inputs to be answered using messages or by establishing two-way communication sessions.

20 Claims, 17 Drawing Sheets

(56) References Cited

U.S. PATENT DOCUMENTS

| | | | |
|---|---|---|---|
| 9,135,561 B2* | 9/2015 | Vadlamani | G06N 5/022 |
| 9,495,962 B2* | 11/2016 | Govrin | G10L 15/22 |
| 9,978,367 B2* | 5/2018 | Aleksic | G06F 40/30 |
| 10,331,402 B1* | 6/2019 | Spector | G10L 15/1815 |
| 10,360,265 B1* | 7/2019 | Agarwal | G10L 15/1815 |
| 10,430,426 B2* | 10/2019 | Byron | G06N 5/04 |
| 10,497,365 B2* | 12/2019 | Gruber | G10L 15/28 |
| 2011/0123004 A1* | 5/2011 | Chang | G06F 16/433 379/88.01 |
| 2013/0036086 A1* | 2/2013 | Barker | G06F 16/38 707/E17.008 |
| 2014/0040748 A1* | 2/2014 | Lemay | G06F 3/04817 715/728 |
| 2014/0222436 A1* | 8/2014 | Binder | G06F 3/167 704/275 |
| 2014/0365885 A1* | 12/2014 | Carson | G06F 16/3344 715/708 |
| 2015/0066479 A1* | 3/2015 | Pasupalak | G06F 16/90332 704/9 |
| 2015/0193379 A1* | 7/2015 | Mehta | G10L 15/00 704/9 |
| 2015/0193682 A1* | 7/2015 | Baughman | G06F 16/2365 707/728 |
| 2016/0110071 A1* | 4/2016 | Brown | H04L 51/04 715/758 |
| 2016/0125031 A1* | 5/2016 | Basalamah | G06Q 10/08 707/769 |
| 2016/0188565 A1* | 6/2016 | Robichaud | G06F 16/3344 704/9 |
| 2016/0188738 A1* | 6/2016 | Gruber | G06F 16/248 707/769 |
| 2016/0253434 A1* | 9/2016 | Yu | G06N 20/00 707/760 |
| 2017/0162197 A1* | 6/2017 | Cohen | G10L 15/22 |
| 2018/0018959 A1* | 1/2018 | Des Jardins | G10L 15/22 |
| 2018/0068031 A1* | 3/2018 | Hewavitharana | G06N 3/006 |
| 2018/0143967 A1* | 5/2018 | Anbazhagan | G10L 15/183 |
| 2018/0144046 A1* | 5/2018 | Braga | G06F 16/3329 |
| 2018/0165596 A1* | 6/2018 | Abrams | G06N 5/04 |
| 2018/0190272 A1* | 7/2018 | Georges | G10L 15/22 |
| 2018/0261203 A1* | 9/2018 | Zoller | G10L 13/00 |
| 2019/0027147 A1* | 1/2019 | Diamant | G06F 16/532 |
| 2019/0057693 A1* | 2/2019 | Fry | G10L 15/26 |
| 2019/0065498 A1* | 2/2019 | Yuan | G06F 16/24522 |
| 2019/0065556 A1* | 2/2019 | Kumar | G06F 16/3329 |
| 2019/0130286 A1* | 5/2019 | Salameh | G06N 5/022 |
| 2019/0156222 A1* | 5/2019 | Emma | G06F 16/3329 |
| 2019/0236464 A1* | 8/2019 | Feinson | G06N 5/04 |
| 2019/0237068 A1* | 8/2019 | Canim | G10L 15/22 |
| 2019/0272768 A1* | 9/2019 | Clark | G09B 7/02 |
| 2019/0279627 A1* | 9/2019 | Wang | G06F 16/632 |
| 2019/0279633 A1* | 9/2019 | Venkata | G06T 7/70 |
| 2019/0311151 A1* | 10/2019 | Coburn, IV | G06F 21/10 |
| 2019/0325081 A1* | 10/2019 | Liu | G06F 16/3323 |
| 2020/0089698 A1* | 3/2020 | Braga | G06K 9/6253 |
| 2020/0328906 A1* | 10/2020 | Raghavan | H04L 63/104 |

* cited by examiner

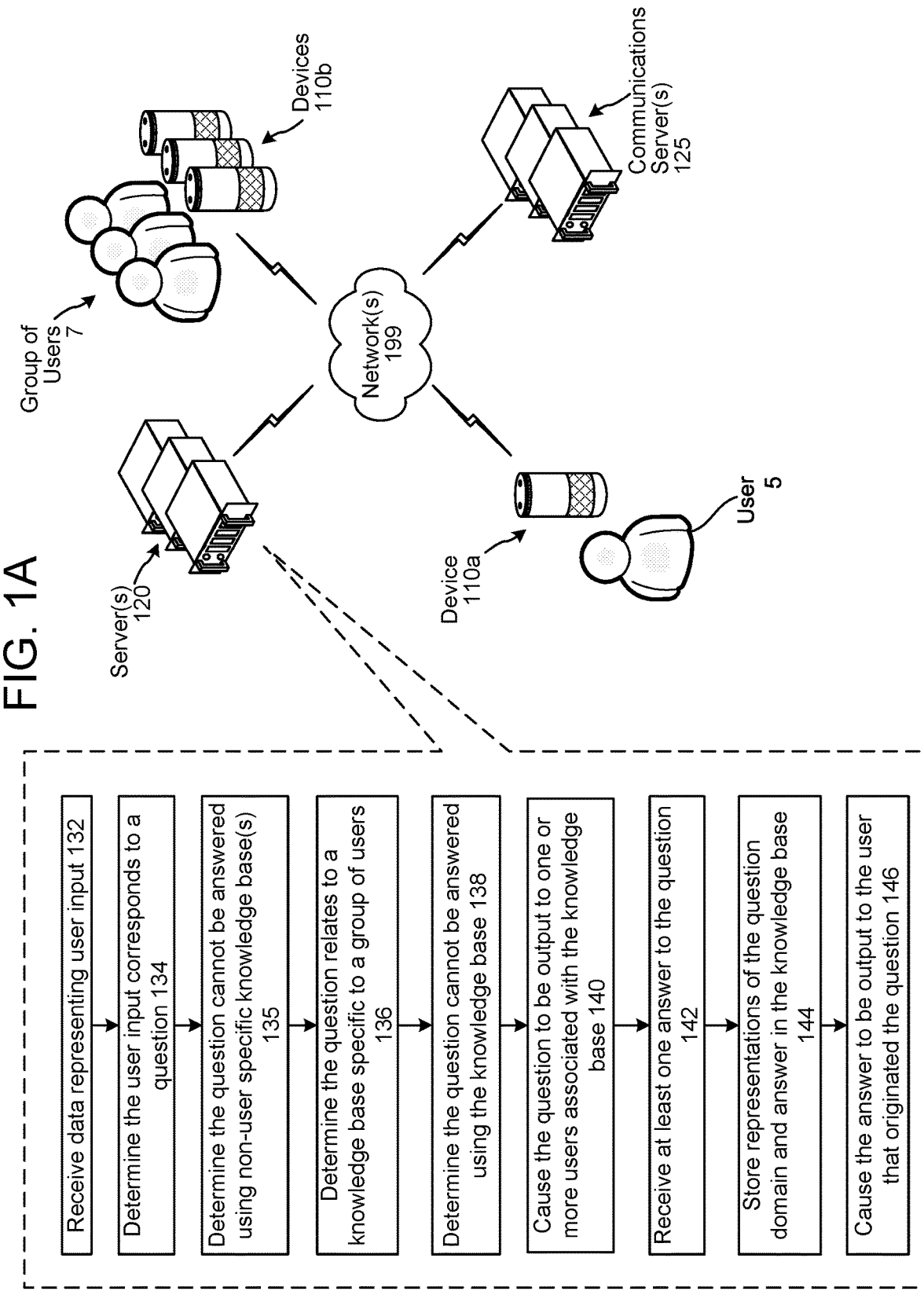

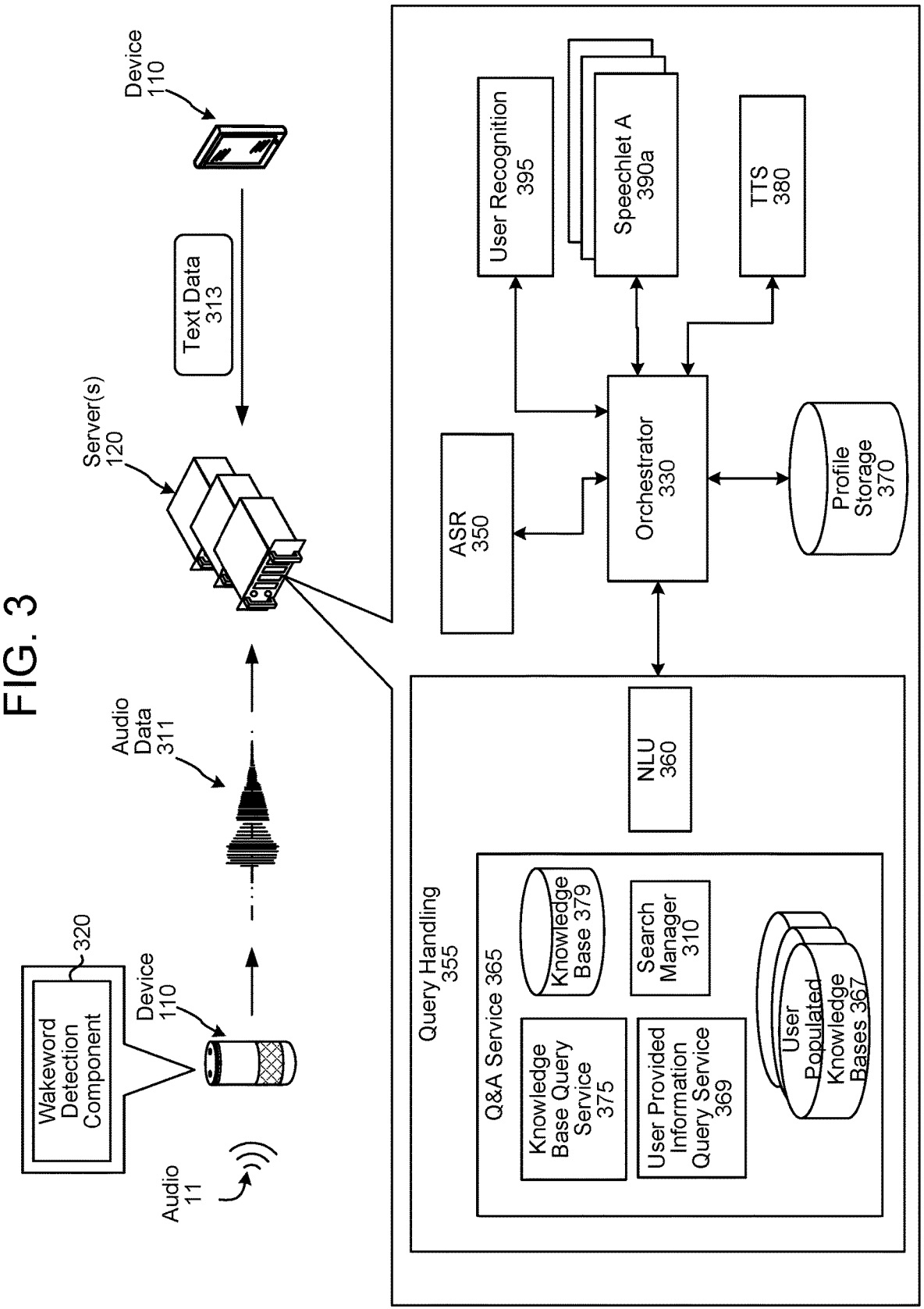

SYSTEM ANSWERING OF USER INPUTS

CROSS REFERENCE TO RELATED APPLICATION

This application is a continuation of and claims priority to U.S. Nonprovisional patent application Ser. No. 16/014,524, entitled "SYSTEM ANSWERING OF USER INPUTS," filed on Jun. 21, 2018, which is scheduled to issue as U.S. Pat. No. 10,956,462, the contents of which are expressly incorporated herein in its entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to answer user inputs according to embodiments of the present disclosure.

FIG. 3 is a conceptual diagram of components of a system according to embodiments of the present disclosure.

DETAILED DESCRIPTION

Figure 1B:
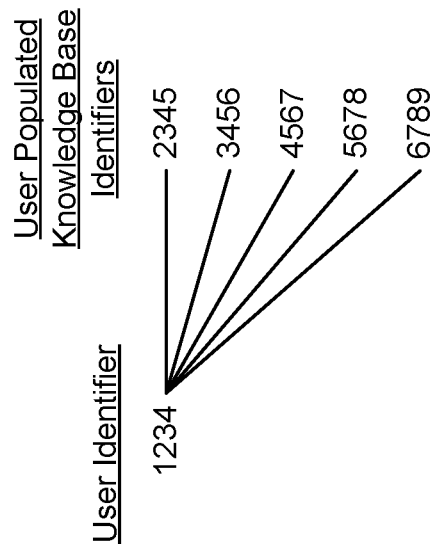
FIG. 1B is a conceptual diagram illustrating a user identifier associated with various user populated knowledge bases according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems may be configured to perform actions responsive to user inputs. For example, a system may be configured to output weather information in response to a user input corresponding to "Alexa, what is the weather." For further example, a system may be configured to output music performed by Adele in response to a user input corresponding to "Alexa, play Adele music."

A user input may include a question to be answered by the system. That is, the user may ask the system to provide information in response to the user input. The ultimate action to be performed by the system in this example would be to provide the requested information.

A system may include one or more information services that attempt to determine an answer to a user input. One information service may use a knowledge base storing verified facts organized in a particular manner. Another information service may perform web querying, where a search string is input into a search engine. Other information services may also be used.

The foregoing information services may be used to answer general user questions that may be relevant to various users of a system, such as questions about general knowledge, facts, etc. The foregoing information services may not necessarily be configured to answer user inputs related to a particular user, or subset of users. For example, the foregoing information services may not be configured to answer user inputs such as "Alexa, when was the hot water heater last replaced," "Alexa, where are the trash bags," "Alexa, when is the garbage collection coming," or "Alexa, is today a snow day for my children." Such questions relate to topics specific to a user or group of users (e.g., a household of users or a group of user's corresponding to parents of a school). The information services available to a general system may not be configured to answer such questions.

The present disclosure improves such systems by including knowledge bases that are specific to a user or group of users (e.g., a knowledge base storing information specific to a group of users corresponding to parents of a school, a household, etc.). A knowledge base may be populated with information provided by users associated with the knowledge base. For example, a parent of a child that attends a particular school may cause a system to store information indicating today is a snow day in a knowledge base specific to parents of children that attend the school. For further example, a member of a household may cause a system to store information indicating when the hot water heater of the household was last replaced in a knowledge base associated with users of the household.

Users associated with a knowledge base may be proactive in providing content to the knowledge base. For example, a user may provide the system with input corresponding to "Alexa, the trash bags are under the sink" or "Alexa, save to my household's knowledge base that the trash bags are under the sink." In response to the foregoing user inputs, the system may populate the user's household's knowledge base with data representing the trash bags are under the sink. Thus, if later a request is received by the system asking for the location of the trash bags (such as by a visitor to the home), the system may be configured to identify the question as one specific to the home and may thus access the household's knowledge base to obtain the answer to the question.

In addition or alternatively, the system may solicit an answer to a user input from users associated with a particular knowledge base (e.g., one associated with the topic of the user input). That is, the system may crowdsource answers to a user input from users associated with a knowledge base related to the user input. When the system receives an answer, the system may populate the knowledge base with the answer and may output the answer to the user that originated the user input. For example, a user may ask a system "Alexa, is today a snow day for my children." The system may be unable to determine an answer to the question using a knowledge base associated with users that have children that attend a school the user's children attend. The system may output the question to one or more of the users associated with the knowledge base. When a user provides an answer to the question, the system stores the answer in the knowledge base and outputs the answer to the user that input the question to the system.

While a knowledge base may be associated with multiple users, a subset of the users (e.g., one or more than one but not all of the users) may be designated as an "expert" or similar such designation for the knowledge base (or a subset of topics covered therein). Such a designation may result in the system soliciting answers to user inputs from an expert(s) associated with a knowledge base without necessarily soliciting answers from all users associated with the knowledge base. For example, multiple users may be associated with a knowledge base specific to parents of children that attend a particular school. One or more parents belonging to a parent teacher association may be designated as experts with respect to the knowledge base regarding the respective school. For further example, multiple users may be associated with a knowledge base specific to a household, but one or more parents of the household may be designated as experts with respect to the knowledge base. In another example, multiple users (e.g., guests and concierges) may be associated with a knowledge base specific to a hotel, but only the concierge(s) may be designated as an expert with respect to the knowledge base. Such designation(s) may be premised on the fact or assumption that the designated expert user(s) is more knowledgeable about user inputs relating to the knowledge base than other users associated with the knowledge base. Alternatively, a system may solicit answers from all users associated with a knowledge base and weight the answers of "expert" users more heavily than answers of "non-expert" users.

A system implementing the present disclosure may require user permission to perform the teachings herein. That is, a system may require a user opt in, with informed consent, prior to the system being able to implement the teachings herein with respect to the user.

FIG. 1A illustrates a system configured to answer user inputs using specific knowledge bases. Although the figures and discussion of the present disclosure illustrate certain operational steps of the system in a particular order, the steps described may be performed in a different order (as well as certain steps removed or added) without departing from the intent of the disclosure. One or more devices (illustrated as 110a local to a user 5 and a group of devices 110b local to a group of users 7), one or more servers 120, and one or more communications servers 125 may communicate across one or more networks 199.

The user 5 may provide the device 110a with a user input representing a question. The user input may originate as audio representing the user's speech. For example, the device 110a may capture audio representing the user speech and generate audio data representing the audio. The user input may alternatively originate as text input to the device 110a via a keyboard. The device 110a may generate text data representing the text. The device 110a may send the audio data or text data to the server(s) 120, which the server(s) receives (132).

The server(s) 120 determines (134) the user input corresponds to a question. If the server(s) 120 receives audio data, the server(s) 120 may perform ASR processing on the audio data to generate text data representing the user input. The server(s) 120 may implement a question and answering (Q&A) service (described in detail below) to determine the text data (either received by the device at step 132 or generated by performing ASR processing on audio data received at step 132) represents a question to be answered.

A user identifier of the user 5 may be associated with various knowledge bases, as illustrated in FIG. 1B. For example, the user identifier may be associated with a household knowledge base's identifier, a neighborhood knowledge base's identifier, a school parents knowledge base's identifier, etc. The system may associate a user identifier with a knowledge base identifier after obtaining permission from the user, or an instruction from the user to do so.

Each knowledge base may be used to answer different types of user questions. For example, a household knowledge base may be used to determine answers to questions related to the user's household, a neighborhood knowledge base may be used to determine answers to questions related to the neighborhood in which the user lives, etc.

The server(s) 120 may determine (135) the question cannot be answered using non-user specific knowledge bases of the system. For example, as described with respect to FIG. 3 below, the server(s) 120 may be configured with knowledge bases storing information corresponding to various topics. The server(s) 120 may also be configured to perform web-based searching to determine an answer to a question. The server(s) 120 may be unsuccessful at determining an answer to the question using the foregoing knowledge bases or web-based searching. For example, the server(s) 120 may not be able to determine an answer that satisfies a confidence threshold.

Thereafter, the server(s) 120 may determine (136) the question relates to a knowledge base specific to a group of users. For example, if the text data (either received by the device at step 132 or generated by performing ASR processing on audio data received at step 132) represents the question as "when was the hot water heater last replaced," the server(s) 120 may determine the question relates to a household, determine the user's identifier (or an identifier of the device 110) is associated with a group profile corresponding to a household profile, and determine a knowledge base associated with the group profile (e.g., determine a knowledge base associated with the group profile's identifier). For further example, if the text data represents the question as "is today a snow day for my children," the server(s) 120 may determine the question relates to a school and determine the user's identifier (or the device's identifier) is associated with a knowledge base that is associated with a knowledge base associated with a group of users corresponding to parents of children that attend a same school as that is attended by the user's children.

A user identifier and/or device identifier may become associated with a knowledge base based on user input. For example, a user may provide the system with an input indicating the user wants their user profile or a device profile associated with a particular knowledge base. In response, the system may associate the user's identifier or the device's identifier with the knowledge base (and more particular an identifier of the knowledge base).

The device 110a may be a transient device in that the user 5 may use the device 110a at different locations. The server(s) 120 may determine a location of the device 110a when the device 110a captured the user input and may determine the knowledge base using the location. This may be beneficial because the device 110a may be associated with more than one knowledge base including similar content but each of the more than one knowledge bases may be associated with a different location.

The user input may indicate which knowledge base to consult to attempt to determine an answer. For example, a user input may correspond to "Alexa, ask household where the paper towels are." The system may determine the portion of the user input corresponding to "ask" indicates the user input is a question, the portion corresponding to "household" is the knowledge base to be consulted, and the portion corresponding to "where the paper towels are" corresponds to the question to be answered.

The server(s) 120 determines (138) the question cannot be answered using the determined knowledge base. The knowledge base may be populated with information previously provided by users associated with the knowledge base. In the example where the question corresponds to "is today a snow day for my children," a user(s) associated with the knowledge base may not yet have caused the knowledge base to store information indicating whether today is a snow day for the school attended by the user's children. Thus, the server(s) 120 may be unable to determine an answer to the question, or may determine an answer that is associated with a confidence value that does not satisfy a threshold confidence. For example, the knowledge base may include information indicating yesterday was a snow day, may determine that information corresponds to an answer to the question (even though the information relates to yesterday and the question relates to today), and may determine a confidence value representing the information answers the question, but the confidence value may not satisfy a system established threshold confidence below which determined answers are considered by the system as not answering the present question.

Figure 2A:
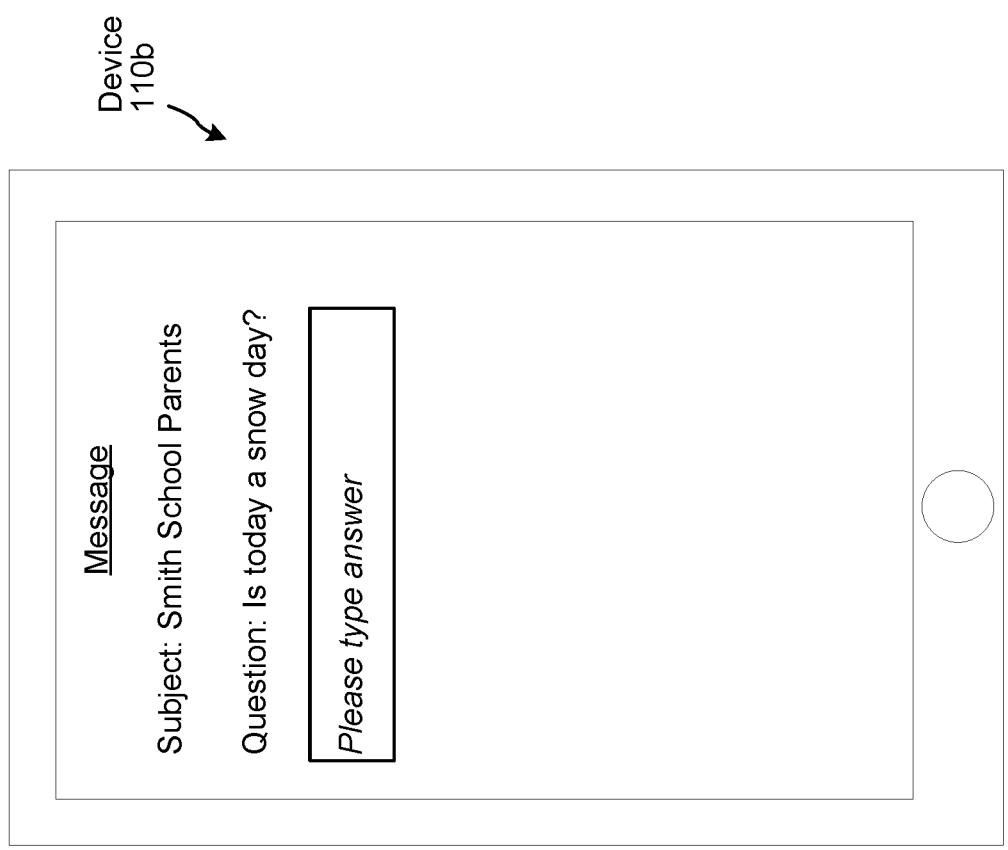
FIG. 2A illustrates the presentment of a question to be answered according to embodiments of the present disclosure.
Figure 2B:
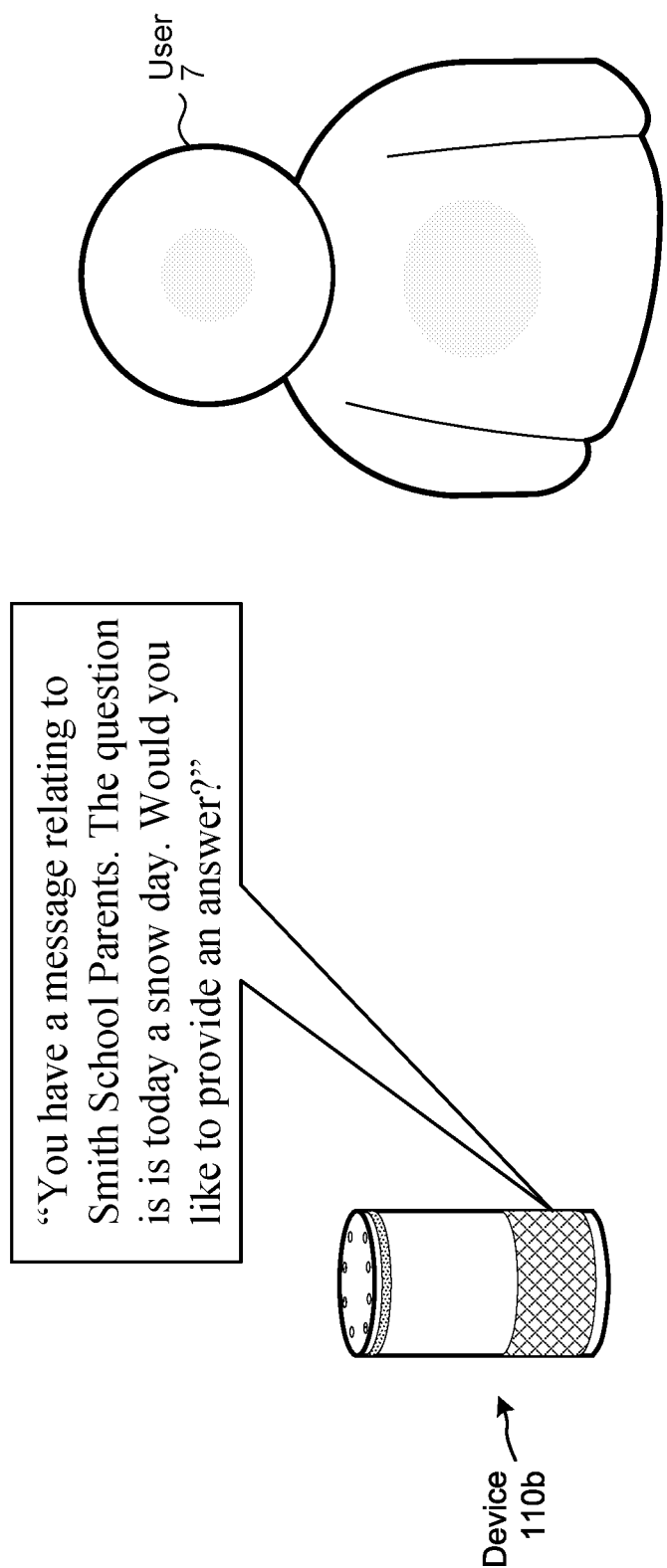
FIG. 2B illustrates the presentment of a question to be answered according to embodiments of the present disclosure.

The server(s) 120 causes (140) the question to be output to one or more users associated with the knowledge base. The server(s) 120 may determine user identifiers associated with the knowledge base, determine device identifiers associated with the user identifiers, and cause the devices 110b to output the question. The devices 110b may output indicators that the question needs answering and only output the question in response to a user instruction to do so. An indicator may correspond to activation of a light(s) of the device 110b, output of synthesized speech (e.g., audio) by the device 110b, and/or display of text by the device 110b. A device 110b may output the question as text (as illustrated in FIG. 2A). A device 110b may also or alternatively output the question as audio (as illustrated in FIG. 2B). The question to be answered may be output by a device 110 as a text message, product listing page, social media posting to a particular social media group's page, email, etc.

In an example, the server(s) 120 may send a message representing the question to one or more of the devices 110b via a communications server(s) 125. The communications server(s) 125 may be configured to perform multiple endpoint communications as well as send messages to recipient devices as described in detail herein.

The server(s) 120 may output the question to one or more users without input from the user 5 or the server(s) 120 may receive input from the user 5 with respect to which users associated with the knowledge base should receive the question for answering. Such enables the user 5 to have confidence that the ultimately provided answer is reliable. In an example, once the server(s) 120 determines the question cannot be answered using the knowledge base, the server(s) 120 may cause the device 110a to output audio and/or display text representing the knowledge base and requesting the user 5 indicate which user(s) associated with the knowledge base should be queried to provide an answer. The user 5 may indicate the user(s) to be queried by inputting text to the device 110a or speaking to the device 110a. The server(s) 120 may then cause devices associated with those users to output the question (or an indicator that the question is be answered).

The server(s) 120 receives (142) at least one answer to the question. The server(s) 120 may receive the at least one answer via the communications server(s) 125. A user of the group of users 7 may speak an answer to the question or provide the answer as text. In an example, a user of the group of users 7 may provide an answer by sending the answer as a message via the communications server(s) 125. A device, of the devices 110b, that receives the answer as spoken audio or text may generate audio data or text data representing the answer and send the audio data or text data to the server(s) 120 (e.g., via the communications server(s) 125 in some configurations).

When the system receives an answer, the system may ask the answering user whether the system is permitted to identify the user when outputting the answer. If the system receives such permission from the answering user, the system may indicate the user's name (or other identifying information) when outputting the answer to the user 5.

The server(s) 120 stores (144) representations of the question domain and answer in the knowledge base. The question domain may correspond to a question topic. By storing a representing of the question domain instead of the particular question that was represented in the user input, the system may be able to use the question domain and answer to respond to subsequent user inputs that relate to the same question but may be phrased in different manners by a user. The question domain may correspond to an intent determinable by an NLU component of the system as described herein.

The representations may be stored as text data. The representations may be stored separately (e.g., the server(s) 120 may store text data representing the question and may associate that text data with text data representing the answer). Alternatively, the server(s) 120 may include intelligence that enables the server(s) 120 to convert the question and answer into a statement which the server(s) 120 stores as text data. For example, if the question corresponds to "is today a snow day for my children" and the answer is "yes," the server(s) 120 may store text data corresponding to "today is a snow day" in the knowledge base.

The server(s) 120 causes (146) the answer to be output to the user 5 that originated the question. The server(s) 120 may cause the device 110a to output an indicator that the question has been answered. The indicator may correspond to activation of a light(s) of the device 110a, output of synthesized speech (e.g., audio) by the device 110a, and/or display of text by the device 110a. In response to the user 5 asking the device 110a to output their messages or notifications, the device 110a may output synthesized speech representing the system has an answer to the user's previous question and asking whether the system should output the answer. If the user 5 indicates the answer should be output, the device 110a may output the answer as audio and/or may display the answer as text. One skilled in the art will appreciate that the foregoing user/device interactions may involve the user 5 providing text input to the device 110a and/or the user 5 speaking to the device 110a.

The server(s) 120 may cause the device 110a to output audio and/or display text asking the user 5 whether the provided answer was helpful. If the user 5 indicates the answer was not helpful (e.g., by providing such indication as text or speech), the server(s) 120 may perform steps 140 through 146 with respect to users associated with the knowledge base but not including the user that provided the previous answer.

If the system receives multiple answers to the same question from various users of the group of users associated with the knowledge base, the system may rank the answers and only store the top ranked answer. The system may rank answers based on timeliness of response, the user that provided the response, how many queried users provided the same response, and other considerations. During ranking, a given user's answers may be boosted if the given user's answers are routinely associated with user feedback indicating the user's answers are helpful, and vice versa. For example, after outputting an answer, the system may query the user that received the answer regarding whether the answer was helpful (e.g., after outputting "the garbage bags are under the sink" the system may output "were the garbage bags there"). The system may increase or decrease the reliability score associated with the answer based on the user's feedback.

Described above is an example where a user 5 is notified of an answer to a question once a knowledge base is populated with the answer by a user. In some instances, the knowledge base may already have information that can answer the question of the user 5.

While the above describes information being available to a user 5 that asks a question, one skilled in the art will appreciate that the present disclosure is not so limited. That is, once a knowledge base is populated with information (either proactively by a user or in response to a user's question being answered by another user), all users associated with the knowledge base may have access to the information and all devices associated with the knowledge base may be used to access the information.

As described above, a user input may represent the knowledge base to be consulted to determine an answer to a question in the user input. In other situations, the user input may not indicate the knowledge base. In these situations, the system may determine an answer to the user input using an incorrect knowledge base, resulting in the answer being unresponsive to the user input. For example, the user input may correspond to "is today is snow day for my children" and the system may respond with text and/or audio corresponding to "snow is white and falls from the sky, was that helpful." If the user indicates (either by text or speech) the answer was not helpful, the system may output synthesized speech and/or display text asking the user who the system should ask for an answer. The user may respond (via text or speech) with information indicating a knowledge base (e.g., parents of John Doe School). Over time, the system may use user inputs and associated user indicated knowledge bases for answering the user inputs to determine, for future user inputs, which knowledge bases should be used to answer the future user inputs.

It has been described that user input may originate as text. The user may provide text to a companion application operated by the device. The companion application may send text data, representing the text, to the server(s) 120.

The system may operate using various components as described in FIG. 3. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 320 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 320 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 320 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 311, representing the audio 11, to the server(s) 120. The audio data 311 may include data corresponding to the wakeword, or the portion of the audio data 311 corresponding to the wakeword may be removed by the device 110 prior to sending the audio data 311 to the server(s) 120.

Upon receipt by the server(s) 120, the audio data 311 may be sent to an orchestrator component 330. The orchestrator component 330 may include memory and logic that enables the orchestrator component 330 to transmit various pieces and forms of data to various components of the system, as well as perform other operations as described herein.

The orchestrator component 330 sends the audio data 311 to an ASR component 350. The ASR component 350 transcribes the audio data 311 into text data. The text data output by the ASR component 350 represents one or more than one (e.g., in the form of an N-best list) ASR hypotheses representing an utterance represented in the audio data 311. The ASR component 350 interprets the utterance in the audio data 311 based on a similarity between the audio data 311 and pre-established language models. For example, the ASR component 350 may compare the audio data 311 with models for sounds (e.g., subword units, such as phonemes, etc.) and sequences of sounds to identify words that match the sequence of sounds of the utterance represented in the audio data 311. The ASR component 350 sends the text data generated thereby to a query handling component 355, for example via the orchestrator component 330. The text data sent from the ASR component 350 to the query handling component 355 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

Alternatively, the device 110 may send text data 313 to the server(s) 120. Upon receipt by the server(s) 120, the text data 313 may be sent to the orchestrator component 330. The orchestrator component 330 may send the text data 313 to the query handling component 355.

The query handling component 355 may attempt to process the text data (either generated by the ASR component 350 or output by the device 110) in a number of ways. Those ways may be executed at least partially in parallel. The text data may be sent to a question and answer (Q&A) service component 365. At this point in time, the Q&A service component 365 assumes the text data corresponds to a request for information. As the Q&A service component 365 may operate at least partially in parallel to an NLU component 360, the Q&A service component 365 may not know if the text data actually corresponds to a request for information, but processing the text data at least partially in parallel between the NLU component 360 and Q&A service component 365 may result in reduced latency.

The text data may be sent to a knowledge base query service 375 which may work in conjunction with a structured knowledge base 379 to attempt to obtain information responsive to the text data. The knowledge base 379 may include a collection of tuples or otherwise semantically (or otherwise) encoded data that can be queried to obtain information. In such a knowledge base 379, certain knowledge bases or information stores may store information in a "tuple" format, where entities are joined together in pairs, triplets, or the like, that define the relationship between two things. For example, a tuple such as [John Doe, husband of, Jane Doe] may describe that John Doe is Jane Doe's husband. Many such tuples may exist in a knowledge base and may be usable to answer user inputs. For example, the above tuple may be used to answer a user input such as "who is Jane Doe's husband," "who is John Doe married to," or the like. One example of such a knowledge base 379 is Amazon's EVI knowledge base.

At least partially in parallel to the knowledge base query service 375 attempting to find an answer to the text data using the knowledge base 379, the Q&A service 365 may operate a search manager 310 to attempt to find an answer to the text data using an unstructured web search. The search manager 310 may input a search string into a search engine. The result for such a web query often takes the form of a list of Internet links rather than an answer to a specific question, and further web queries make no effort at any semantic understanding, relying instead on a solely keyword based search approach.

The Q&A service 365 may operate a user provided information query service 369 at least partially in parallel to the knowledge base query service 375 and/or the search manager 379. The user provided information query service 369 may work in conjunction with various user populated knowledge bases 367 to attempt to obtain information responsive to the text data.

Figure 4:
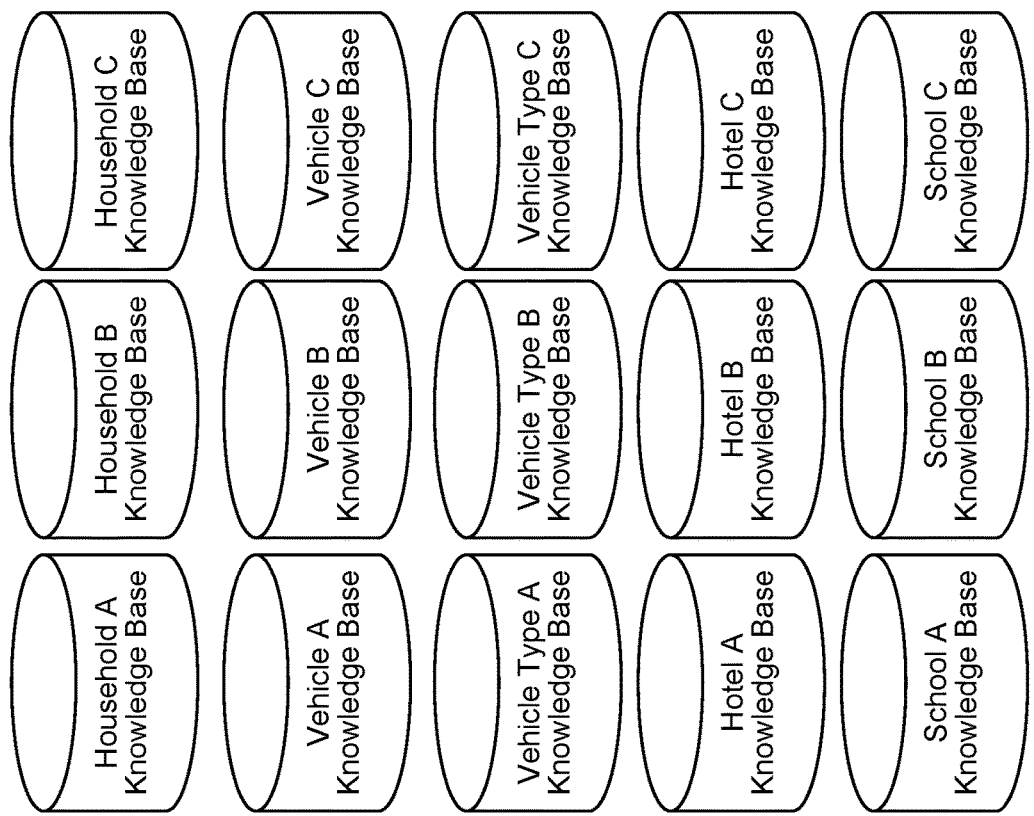
FIG. 4 is a conceptual diagram illustrating various user populated knowledge bases of a system according to embodiments of the present disclosure.

Illustrative user populated knowledge bases 367 are illustrated in FIG. 4. A user populated knowledge base 367 may include at least some content that overlaps with content of another user populated knowledge base 367. Alternatively, a user populated knowledge base 367 may only include content that is not included in any other user populated knowledge base 367.

User populated knowledge bases 367 that include overlapping content may create privacy considerations. For example, a user may be associated with one of the user populated knowledge bases but not the other user populated knowledge base that includes the overlapping content. The system may be configured to limit access to user provided content to only users associated with the same knowledge base. For example, if a user provides content to a first knowledge base, and a second knowledge base includes similar content to the user input content, only users of the first knowledge base may be able to access the user input content (e.g., users of the second knowledge base may not be able to access the user input content).

Each knowledge base 367 may include data representing information provided by users of the system. Each knowledge base 367 may store information relating to a specific topic and/or group of users. For example, one of the knowledge bases 367 may store information provided by users of a household (e.g., user's associated with a particular group profile), one of the knowledge bases 367 may store information provided by a social network of users, one of the knowledge bases 367 may store information provided by users associated with a particular neighborhood, one of the knowledge bases 367 may store information provided by users that own a particular brand of vehicle, one of the knowledge bases 367 may store information provided by users having children that attend a particular school, one of the knowledge bases 367 may store information associated with a particular device (e.g., a particular user's vehicle), etc.

Configuration of knowledge bases 367, as described above, may enable the system to answer questions related to a single user, single device, or specific group of users of the system. For example, by configuring a knowledge base 367 to be specific to a particular user's vehicle, the system may be able to answer the user input "when was my oil last changed" or "when was my air filter last replaced."

A knowledge base 367 may, in addition to being populated using user provided information, be populated based on sensor data. For example, when a mechanic resets an oil light of a vehicle due to the vehicle's oil being changed, the system may populate a knowledge base 367, associated with the vehicle, with data representing a date when the oil light was reset.

A knowledge base 367 may, in addition to being populated using user provided information and/or sensor data, be populated with technical documents. For example, a vehicle may be associated with an operations manual. A knowledge base 367, associated with the vehicle, may be populated with text data and/or image data of the operations manual.

A knowledge base 367 may also or alternatively be populated with information of a forum or blog. For example, the system may have access to information of a vehicle forum. A knowledge base 367, associated with a vehicle associated with the forum (or a thread of the forum), may be populated with text data and/or image data of the forum (or thread).

If the information to be output originated from a source other than a user associated with the knowledge base 367, the system may indicate the source of the information when outputting the information to the user. Such enables the user to determine whether the user trusts the information provided.

A knowledge base 367 may be populated with data after a question is input to the system (as described with respect to FIG. 1A). In addition or alternatively, a knowledge base 367 may be populated with data prior to a question being input to the system. For example, a knowledge base 367 may be populated with data representing today is a snow day for a school prior to a user associated with the school asking the question "is today a snow day." For further example, a knowledge base 367 may be populated with a vehicle's operations manual prior to a user asking the question "how often should I change my oil." In another example, a knowledge base 367 associated with a particular hotel may be pre-populated with the hotel's Wi-Fi password, pool location information, pool hours, breakfast hours, best nightlife spots as provided by the hotel's concierge, etc.

The information stored in a knowledge base 367 may be static (e.g., information representing a date when a house was built, a date when a vehicle was built, etc.). In addition or alternatively, information stored in a knowledge base 367 may be dynamic (e.g., a Wi-Fi password of an establishment may be updated overtime, a concert schedule of a venue may be updated over time, etc.). Information in a knowledge base 367 may be updated on a periodic basis, programmatically. For example, the system may be configured to periodically obtain a concert listing for a venue and may update a knowledge base 367 associated with the concert venue each time the system obtains a concert listing.

At least partially in parallel to the operations of the Q&A service component 365, the system may process the text data using the NLU component 360. The NLU component 360 attempts to make a semantic interpretation of the phrases or statements represented in the text data input therein. That is, the NLU component 360 determines one or more meanings associated with the phrases or statements represented in the text data based on words represented in the text data. The NLU component 360 determines an intent representing an action that a user desires be performed as well as pieces of the text data that allow a device (e.g., the device 110, the server(s) 120, a speechlet component 390, the communications server(s) 125, etc.) to execute the intent. For example, if the text data corresponds to "play Adele music," the NLU component 360 may determine an intent that the system output music and may identify "Adele" as an artist. For further example, if the text data corresponds to "what is the weather," the NLU component 360 may determine an intent that the system output weather information associated with a geographic location of the device 110. In another example, if the text data corresponds to "is today a snow day," the NLU component 360 may determine an intent that the system output information indicating whether today is a snow day for a particular school.

The output from the NLU component 360 (which may include tagged text data, indicators of intent, etc.) may be sent to a speechlet component(s) 390. A "speechlet component" may be software running on the server(s) 120 that is akin to a software application running on a traditional computing device. That is, a speechlet component 390 may enable the server(s) 120 to execute specific functionality in order to provide data or produce some other requested output. The server(s) 120 may be configured with more than one speechlet component 390. For example, a weather service speechlet component may enable the server(s) 120 to provide weather information, a car service speechlet component may enable the server(s) 120 to book a trip with respect to a taxi or ride sharing service, an restaurant speechlet component may enable the server(s) 120 to order a pizza with respect to the restaurant's online ordering system, a communications speechlet component may enable the system to perform messaging or multi-endpoint communications, etc. A speechlet component 390 may operate in conjunction between the server(s) 120 and other devices such as a device 110 in order to complete certain functions. Inputs to a speechlet component 390 may come from speech processing interactions or through other interactions or input sources.

A speechlet component 390 may include hardware, software, firmware, or the like that may be dedicated to a particular speechlet component 390 or shared among different speechlet components 390. A speechlet component 390 may be part of the server(s) 120 (as illustrated in FIG. 3) or may be located at whole (or in part) with separate speechlet servers (not illustrated). A speechlet server(s) may communicate with a speechlet component(s) 390 within the server(s) 120 and/or directly with the orchestrator component 330 or with other components.

Unless expressly stated otherwise, reference to a speechlet, speechlet device, or speechlet component may include a speechlet component operating within the server(s) 120 (for example as speechlet 390) and/or speechlet component operating within a speechlet server(s). Moreover, the functionality described herein as a speechlet or speechlet component may be referred to using many different terms, such as an action, bot, app, or the like.

A speechlet component 390 may be configured to perform one or more actions. An ability to perform such action(s) may sometimes be referred to as a "skill." That is, a skill may enable a speechlet component 390 to execute specific functionality in order to provide data or perform some other action requested by a user. A particular speechlet component 390 may be configured to execute more than one skill. For example, a weather service skill may involve a weather speechlet component providing weather information to the server(s) 120, a car service skill may involve a car service speechlet component booking a trip with respect to a taxi or ride sharing service, an order pizza skill may involve a restaurant speechlet component ordering a pizza with respect to a restaurant's online ordering system, etc.

Speechlet components 390 of the system may be configured to execute different types of skills. Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

If the NLU output (e.g., NLU results data) represents a top scoring NLU hypothesis is associated with a Q&A speechlet component, the NLU results data may be sent to the Q&A speechlet component (which is represented as the Q&A service in FIG. 3). The Q&A service 365 then attempts to determine an answer to a question represented in the received NLU results data. The Q&A service 365 may cause some or all of its components to execute. For example, if none of the Q&A service's components determined, in parallel to NLU processing, an answer with respect to the text data previously input therein, all of the Q&A service's components may be caused to execute with respect to the NLU results data. Alternatively, for example, if some of the Q&A service's components determined, in parallel to NLU processing, an answer with respect to the text data previously input therein, the Q&A service 365 may cause only those components, that did not already determine an answer, to execute with respect to the NLU results data.

The server(s) 120 may include a TTS component 380 that generates audio data (e.g., synthesized speech) from text data using one or more different methods. In one method of synthesis called unit selection, the TTS component 380 matches text data against a database of recorded speech. The TTS component 380 selects matching units of recorded speech and concatenates the units together to form audio data. In another method of synthesis called parametric synthesis, the TTS component 380 varies parameters such as frequency, volume, and noise to create audio data including an artificial speech waveform. Parametric synthesis uses a computerized voice generator, sometimes called a vocoder.

The server(s) 120 may include profile storage 370. The profile storage 370 may include a variety of information related to individual users, groups of users, etc. that interact with the system.

The profile storage 370 may include one or more user profiles, with each user profile being associated with a different user identifier. Each user profile may include various user identifying information. Each user profile may also include preferences of the user and/or one or more device identifiers, representing one or more devices of the user. Each user profile may also include one or more user populated knowledge base identifiers.

The profile storage 370 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The server(s) 120 may include a user recognition component 395 that recognizes one or more users associated with data input to the system. The user recognition component 395 may take as input the audio data 311 and/or text data (output by the ASR component 350 or received from the device 110). The user recognition component 395 determines scores indicating whether user input originated from a particular user. For example, a first score may indicate a likelihood that the user input originated from a first user, a second score may indicate a likelihood that the user input originated from a second user, etc. The user recognition component 395 also determines an overall confidence regarding the accuracy of user recognition operations. The user recognition component 395 may perform user recognition by comparing audio characteristics in the audio data 311 to stored audio characteristics of users. The user recognition component 395 may also perform user recognition by comparing biometric data (e.g., fingerprint data, iris data, etc.), received by the system in correlation with the present user input, to stored biometric data of users. The user recognition component 395 may further perform user recognition by comparing image data (e.g., including a representation of at least a feature of a user), received by the system in correlation with the present user input, with stored image data including representations of features of different users. The user recognition component 395 may perform additional user recognition processes, including those known in the art. Output of the user recognition component 395 may include a single user identifier corresponding to the most likely user that originated the present user input. Alternatively, output of the user recognition component 395 may include an N-best list of user identifiers with respective scores indicating likelihoods of respective users originating the present user input. The output of the user recognition component 395 may be used to inform NLU processing as well as processing performed by other components of the system.

Figure 5:
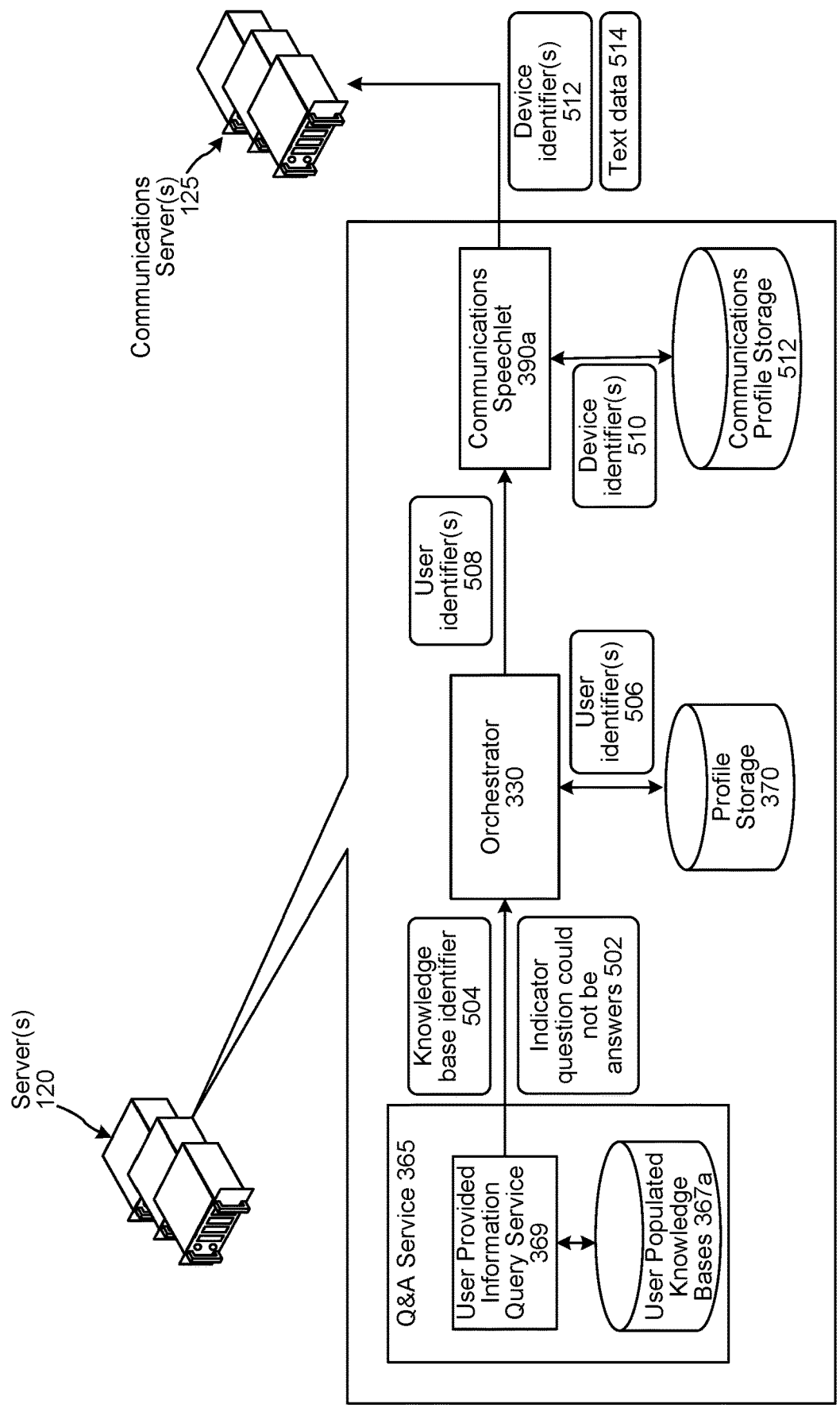
FIG. 5 is a conceptual diagram illustrating how a system may use a communications server(s) to solicit an answer to a user input according to embodiments of the present disclosure.

FIG. 5 illustrates how a system may use the communications server(s) 125 to solicit an answer to a question. After the user provided information query service 369 determines a question cannot be answered using a user populated knowledge base 367*a* associated with the question, the user provided information query service 369 may send, to the orchestrator component 330, an indicator 502 representing the question could not be answered and an identifier 504 of the knowledge base 367*a*.

While it is described that the user provided information query service 369 queries a single user populated knowledge base 367*a* associated with the question, one skilled in the art will appreciate that the user provided information query service 369 may query various user populated knowledge bases 367 to determine an answer to the question. In such implementation, if none of the queried knowledge bases 367 include answers (or none of the queried knowledge bases 367 includes answers satisfying a threshold confidence value), the user provided information query service 369 may send, to the orchestrator component 330, an identifier of each queried knowledge base 367.

The orchestrator component 330 may identify one or more user identifiers 506 associated with the knowledge base's identifier (or associated with the top ranked knowledge base if when the user provided information query service 369 outputs more than one user populated knowledge base's identifier). Associations between the user identifier(s) and the knowledge base identifier may be represented in the profile storage 370. For example, a user's profile may include an identifier of each knowledge base with which the user is associated. A user may be associated with a neighborhood's knowledge base, a household's knowledge base, and a school's knowledge base, for example.

Figure 6:
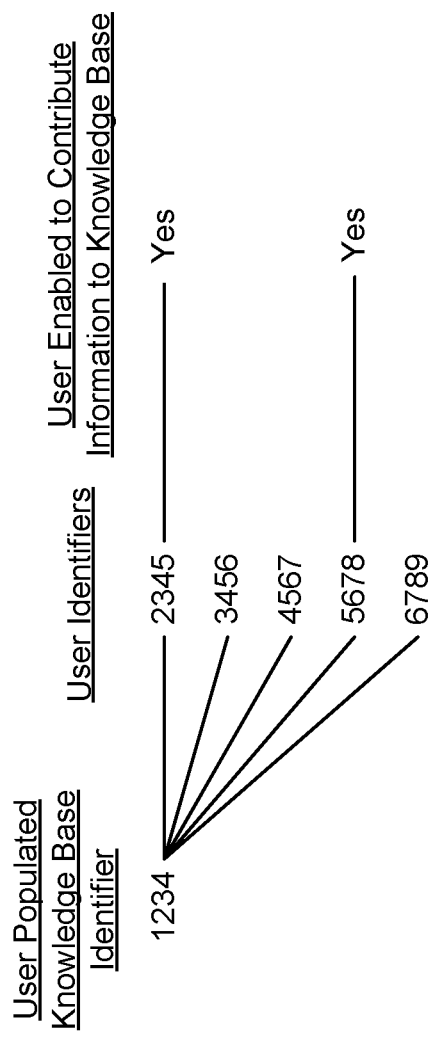
FIG. 6 is a conceptual diagram of a user populated knowledge base's identifier associated with various user identifiers according to embodiments of the present disclosure.

The user identifier(s) 506 may correspond to all user identifiers associated with the knowledge base's identifier, or may correspond to only one or more users specifically enabled to provide answers with respect to the knowledge base 367*a*. For example, of all the user identifiers associated with the knowledge base's identifier, one or more of the user identifiers may be tagged as enabled to provide information that may be stored in (e.g., added to) the knowledge base 367*a*. The user identifiers not tagged as such may correspond to users that may ask the system questions that may be answered using the knowledge base 367*a*, but that may not contribute information to the knowledge base 367*a*. As an example, a hotel's knowledge base identifier may be associated with user identifiers of guests of the hotel and a concierge of the hotel. The concierge's user identifier may be tagged such that the concierge may contribute information to the hotel's knowledge base but the hotel's guests' user identifiers may not be tagged as such. As a result, the hotel's guests' may not contribute information to the hotel's knowledge base. An example of user identifiers associated with a knowledge base's identifier are represented in FIG. 6.

The user identifiers associated with a particular knowledge base identifier may change over time. For example, users may move in and out of a neighborhood. As a result, the user identifiers associated with a knowledge base of the neighborhood may be updated to only include user identifiers of users presently living in the neighborhood. For further example, users may be guests at a hotel (or other rental establishment) for a limited amount of time. As a result, the user identifiers associated with a knowledge base of the hotel (or other rental establishment) may be updated to only include user identifiers of users that are presently staying at the hotel (or other rental establishment).

A user may indicate the user wants to receive answers to questions using information stored in a user populated knowledge base 367 but may not want to provide information to be stored in the user populated knowledge base 367. For example, a parent of a household may indicate their child may receive answers to their questions using the household's knowledge base but that the child is to be prevented from providing content to be stored in the household's knowledge base. For further example, a parent of a child that attends a school may indicate they want to receive answers to questions using a user populated knowledge base 367 associated with the school but do not want to provide content to the school's knowledge base. Such a preference may be stored in the user's profile and may also be associated with the user populated knowledge base's identifier.

The orchestrator component 330 may send the user identifier(s) 508 to a communications speechlet component 390*a*. The communications speechlet component 390*a* may identify one or more device identifiers 510 associated with the user identifier(s) 508. The communications speechlet component 390*a* may communicate with a communications profile storage 512. The communications profile storage 512 may include communications profiles of users, with each communications profile being associated with a user identifier and one or more device identifiers (associated with devices that may perform communications such as messaging or calls). Thus, the communications speechlet component 390*a* may identifier one or more communications profiles, in the communications profile storage 512, that are associated with the user identifier(s) 508 and determine one or more device identifiers 510 associated with the identified user identifier(s) 508. The communications speechlet 390*a* may send the device identifier(s) 512 to the communications server(s) 125. The communications speechlet 390*a* may also send text data 514, representing the question to be answered and information representing the knowledge base, to the communications server(s) 125.

The communications server(s) 125 may cause a device(s) 110 associated with the device identifier(s) to output an indicator that a question requires an answer. An indicator may correspond to activation of a light(s) of the device 110, output of synthesized speech (e.g., audio) by the device 110, and/or display of text by the device 110. The device(s) 110 may receive an answer to the question as a text input or as speech of a user.

The communications server(s) 125 may be configured to establish a two-way communication session (e.g., a call)

between a device 110*b* associated with the device identifier 512 and the device 110*a* (e.g., the device that captured the question). For example, if a hotel's guest interacts with a device to ask a question that cannot be answered using the hotel's knowledge base 367, the communications server(s) 125 may cause (or attempt to cause) a two-way communication session to be established between the device the guest interacted with and a device associated with a concierge of the hotel. In this example, the device identifier (510/512) may simply be that of the concierge.

The system may be configured to only invoke the communications server(s) 125 to establish a two-way communication session if the question relates to a particular topic. A knowledge base 367 may be associated with one or more topics that the system considers worthy to be escalated into a two-way communication session. If the system determines the question corresponds to one of the topics, the system may cause the communication server(s) 125 to establish a two-way communication session. If the system determines the question does not correspond to one of the topics, the system may simply cause the communication server(s) 125 to send a message to a device 110, with the message indicating the question to be answered. The foregoing enables the system to not escalate "less urgent" or "less important" questions into two-way communication sessions.

Figure 7:
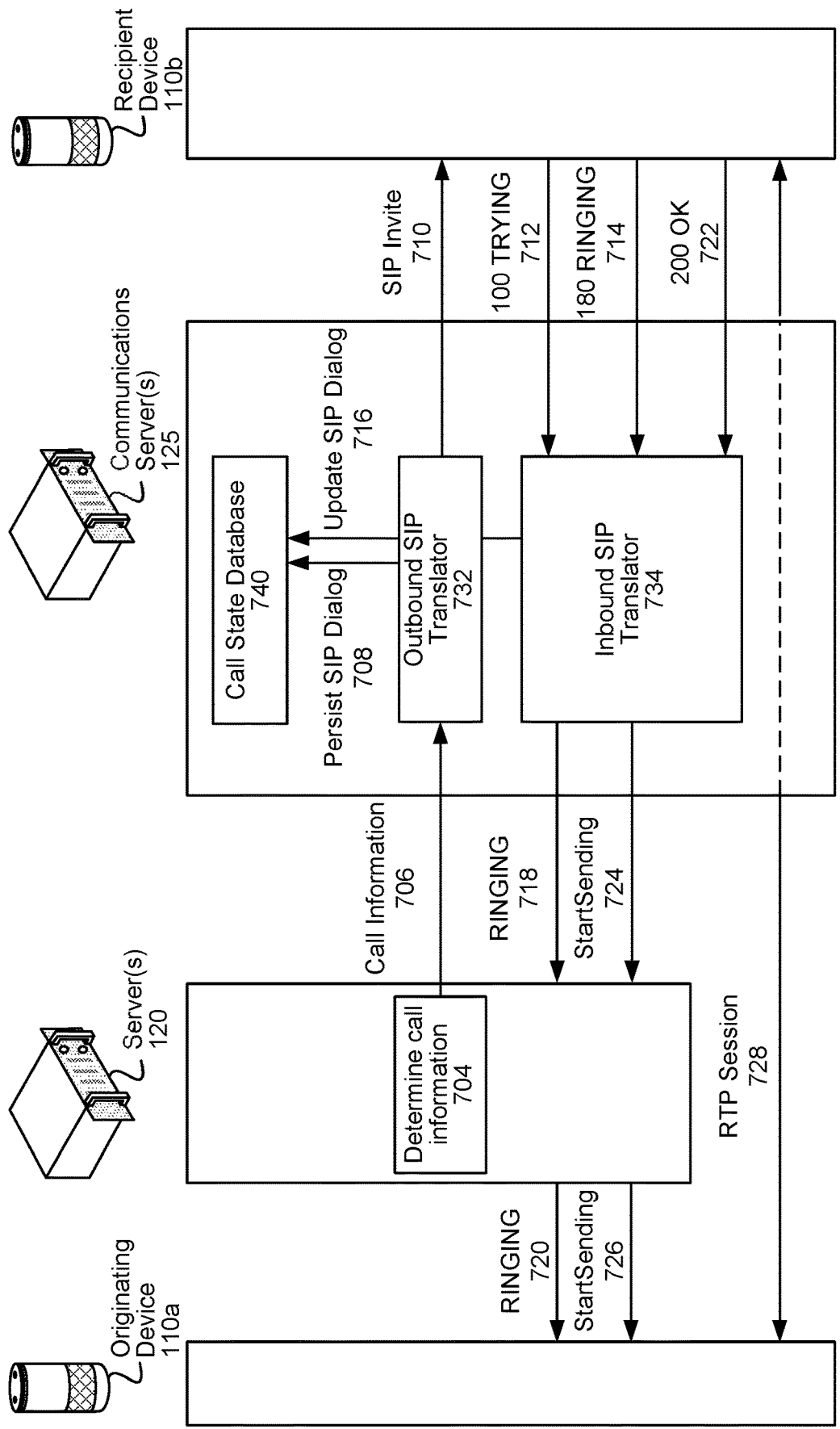
FIG. 7 illustrates an example of signaling to initiate a communication session according to embodiments of the present disclosure.

FIGS. 7-9B illustrate components that can be used to coordinate communications using the communications server(s) 125. FIG. 7 illustrates an example of signaling to initiate a communication session according to the present disclosure. In one example, the server(s) 120 is configured to enable processing of user inputs (e.g., perform ASR, NLU, etc. to identify a spoken command included in audio data), whereas the communications server(s) 125 is configured to enable communication sessions (e.g., using session initiation protocol (SIP)). For example, the communications server(s) 125 may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC), and/or the like. For example, the communications server(s) 125 may send SIP messages to initiate a single RTP media stream between two endpoints (e.g., direct RTP media stream between an originating device 110*a* and a recipient device 110*b* and/or to initiate and facilitate RTP media connections between the two endpoints (e.g., RTP media streams between the originating device 110*a* and the communications server(s) 125 and between the communications server(s) 125 and a recipient device 110*b*). During a communication session, the communications server(s) 125 may initiate two media streams, with a first media stream corresponding to audio data sent from the originating device 110*a* and to a recipient device 110*b* and a second media stream corresponding to audio data sent from the recipient device 110*b* and to the originating device 110*a*, although for ease of explanation this may be illustrated as a single RTP media stream.

As illustrated in FIG. 7, the server(s) 120, namely the communications speechlet component 390*a*, may determine (704) call information (e.g., the device identifier 512 and text data 514) and may send (706) the call information to the communications server(s) 125. While FIG. 7 illustrates the server(s) 120 sending the call information to the communications server(s) 125 in a single step (e.g., 706), the present disclosure is not limited thereto. Instead, the server(s) 120 may send the call information to the originating device 110*a* and the originating device 110*a* may send the call information to the communications server(s) 125 in order to initiate the call without departing from the present disclosure. Thus, the server(s) 120 may not communicate directly with the communications server(s) 125 in step 706, but may instead instruct the originating device 110*a* to communicate with the communications server(s) 125 in order to initiate the call.

The communications server(s) 125 may include an outbound SIP translator 732, an inbound SIP translator 734, and a call state database 740. The outbound SIP translator 732 may include logic to convert commands received from the server(s) 120 into SIP requests/responses and may handle sending outgoing SIP requests and sending responses to incoming SIP requests. After receiving the call information, the outbound SIP translator 732 may persist (708) a SIP dialog using the call state database 740. For example, the DSN may include information such as the name, location, and driver associated with the call state database 740 (and, in some examples, a user identifier and password of the originating user) and the outbound SIP translator 732 may send a SIP dialog to the call state database 740 regarding the communication session. The call state database 740 may persist the call state if provided a device identifier and one of a call identifier or a dialog identifier. The outbound SIP translator 732 may send (710) a SIP Invite to the recipient device 110*b* associated with the device identifier 512 in the call information 706, a Session Border Controller (SBC), or the like. While one recipient device 110*b* is illustrated, one skilled in the art will appreciate that SIP invites may be sent to more than one recipient device (e.g., all devices associated with user identifiers that are tagged as being permitted to contribute information to the knowledge base 376 associated with the present user question).

The inbound SIP translator 734 may include logic to convert SIP requests/responses into commands to send to the server(s) 120 and may handle receiving incoming SIP requests and incoming SIP responses. The recipient device 110*b* may send (712) a 100 TRYING message to the inbound SIP translator 734 and may send (714) a 180 RINGING message to the inbound SIP translator 734. The inbound SIP translator 734 may update (716) the SIP dialog using the call state database 740 and may send (718) a RINGING message to the server(s) 120, which may send (720) the RINGING message to the originating device 110*a*. Alternatively, the inbound SIP translator 734 may send the RINGING message to the originating device 110*a* without using the server(s) 120 as an intermediary.

When the communication session is accepted by the recipient device 110*b*, the recipient device 110*b* may send (722) a 200 OK message to the inbound SIP translator 734, the inbound SIP translator 745 may send (724) a startSending message to the server(s) 120, and the server(s) 120 may send (726) the startSending message to the originating device 110*a*. Alternatively, the inbound SIP translator 734 may send the startSending message to the originating device 110*a* without using the server(s) 120 as an intermediary. The startSending message may include information associated with an internet protocol (IP) address, a port, encoding, or the like required to initiate the communication session. Using the startSending message, the originating device 110*a* may establish (728) an RTP communication session with the recipient device 110*b* via the communications server(s) 125. The RTP session may be referred to as direct audio communication functionality as speech captured by one device of the RTP session may be sent as audio data to another device of the RTP session, which outputs the speech to a recipient user.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Figure 8A:
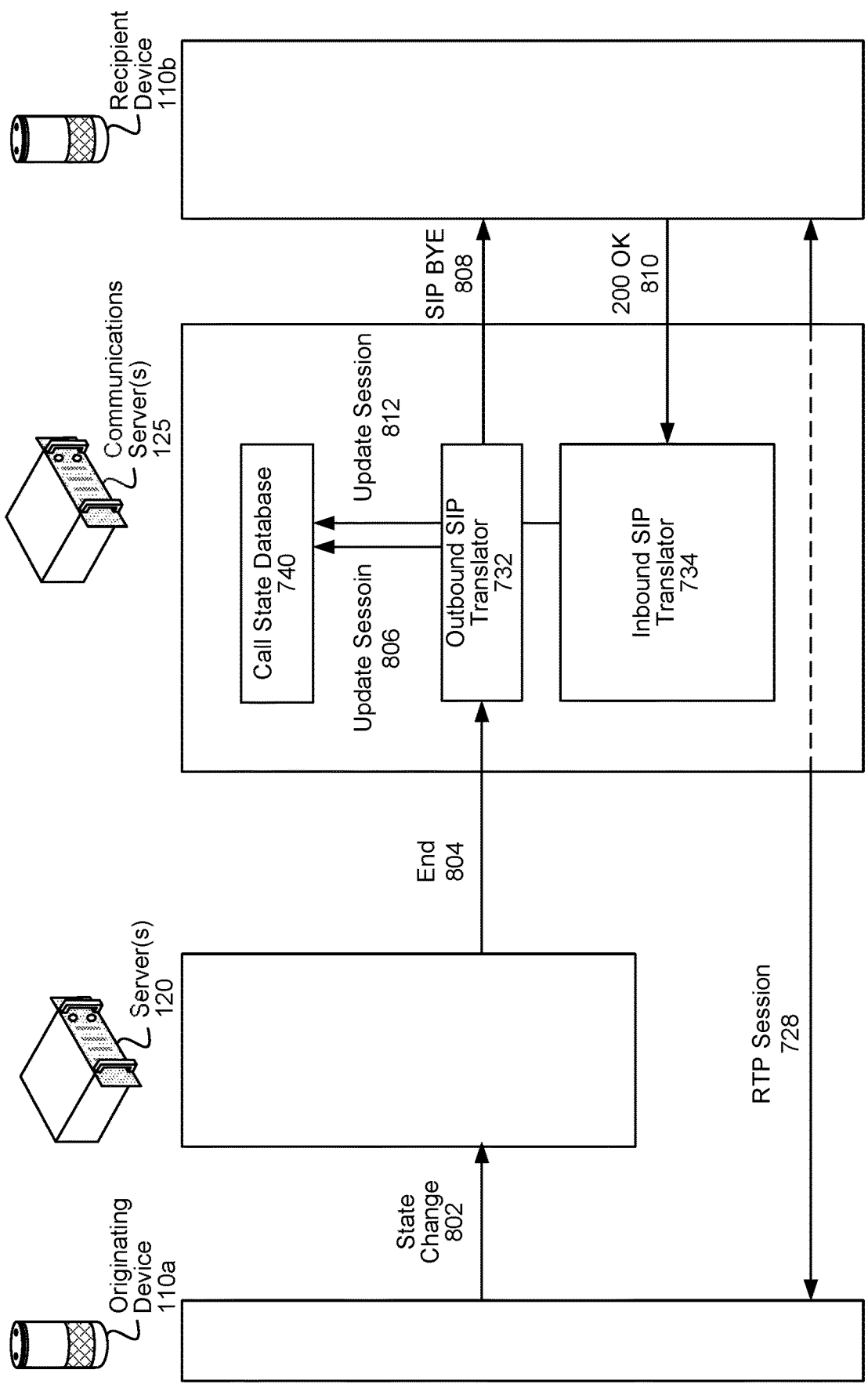
FIGS. 8A and 8B illustrate examples of signaling to end a communication session according to embodiments of the present disclosure.
Figure 8B:
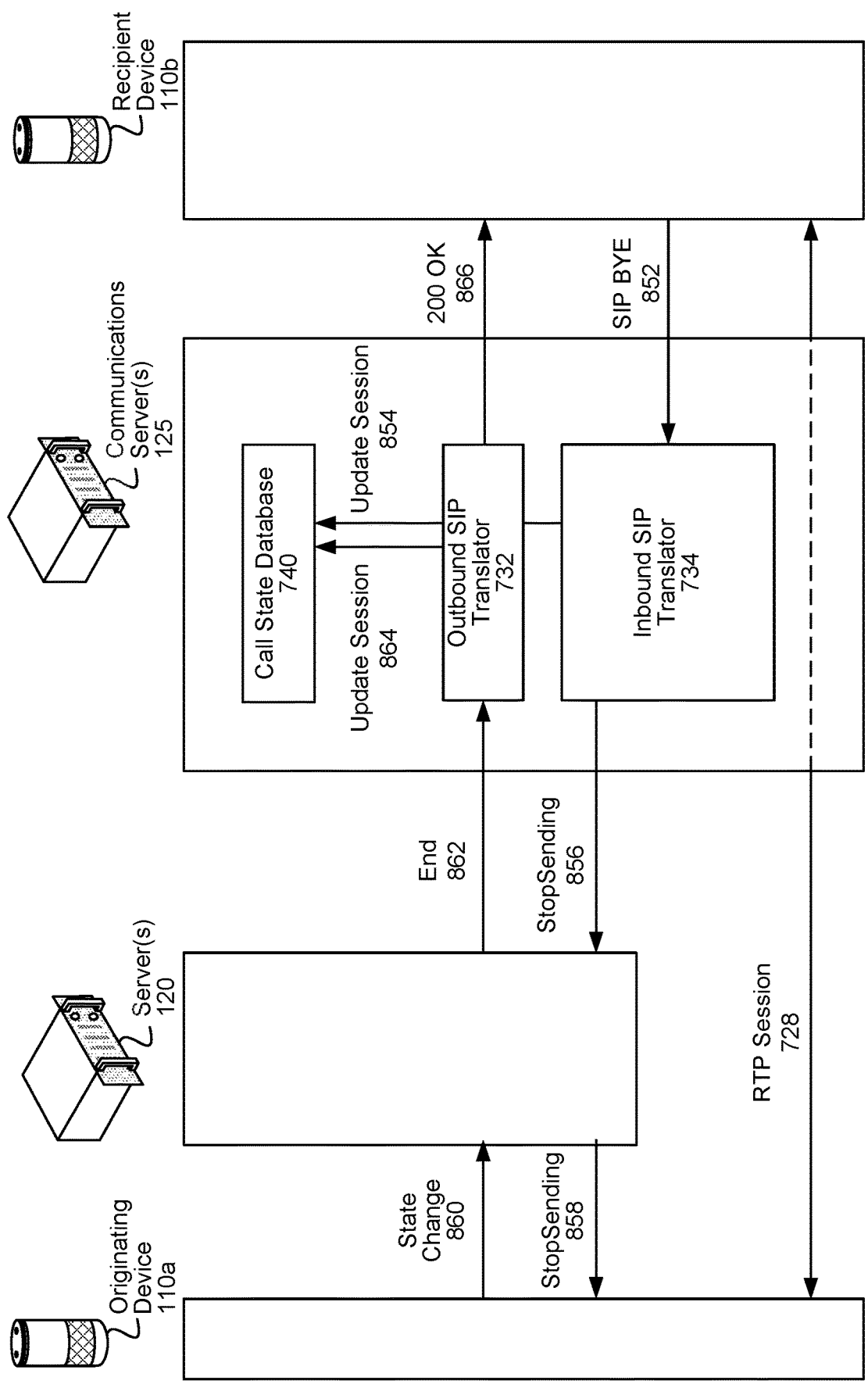

FIGS. 8A and 8B illustrate examples of signaling to end a communication session according to the present disclosure. After establishing the RTP communication session 728 between the originating device 110a and the recipient device 110b, the RTP communication session may be ended by a user inputting a command, to end the call, to the originating device 110a, as illustrated in FIG. 8A, or a user inputting a command, to end the call, to the recipient device 110b, as illustrated in FIG. 8B.

As illustrated in FIG. 8A, the originating device 110a may send (802) a state change message to the server(s) 120 and the server(s) 120 may send (804) an end message to the communications server(s) 125. The outbound SIP translator 732 may update (806) the session using the call state database 740 and may send (808) a SIP BYE message to the recipient device 110b. The recipient device 110b may send (810) a 200 OK message to the inbound SIP translator 734 and the inbound SIP translator 734 may update (812) the session using the call state database 740. In some examples, the inbound SIP translator 734 may send the 200 OK message to the originating device 110a to confirm the communication session has been ended. As a result, the RTP communication session 728 may be ended between the originating device 110a and the recipient device 110b.

As illustrated in FIG. 8B, the recipient device 110b may send (852) a SIP BYE message to the inbound SIP translator 734 and the inbound SIP translator 734 may update (854) the session using the call state database 740. The inbound SIP translator 734 may send (856) a stopSending message to the server(s) 120 and the server(s) 120 may send (858) the stopSending message to the originating device 110a. The originating device 110a may send (860) a state change message to the server(s) 120 and the server(s) 120 may send (862) an End message to the outbound SIP translator 732, the End message including a DSN. The outbound SIP translator 732 may then update (864) the session using the call state database 740, and send (866) a 200 OK message to the recipient device 110b. As a result, the RTP communication session 728 may be ended between the originating device 110a and the recipient device 110b.

While FIGS. 8A and 8B illustrate the server(s) 120 acting as an intermediary between the originating device 110a and the communications server(s) 125, the present disclosure is not limited thereto. Instead, steps 802 and 804 may be combined into a single step and the originating device 110a may send the state change message and/or the End message to the communications server(s) 125 without using the server(s) 120 as an intermediary. Similarly, steps 866 and 858 may be combined into a single step and the communications server(s) 125 may send the StopSending message to the originating device 110a without using the server(s) 120 as an intermediary, and/or steps 860 and 862 may be combined into a single step and the originating device 110a may send the state change message and/or the End message to the communications server(s) 125 without using the server(s) 120 as an intermediary.

While FIGS. 7, 8A, and 8B illustrate the RTP communication session 728 being established between the originating device 110a and the recipient device 110b, the present disclosure is not limited thereto. The RTP communication session 728 may be established between the originating device 110a and a telephone network associated with the recipient device 110b without departing from the present disclosure.

Figure 9A:
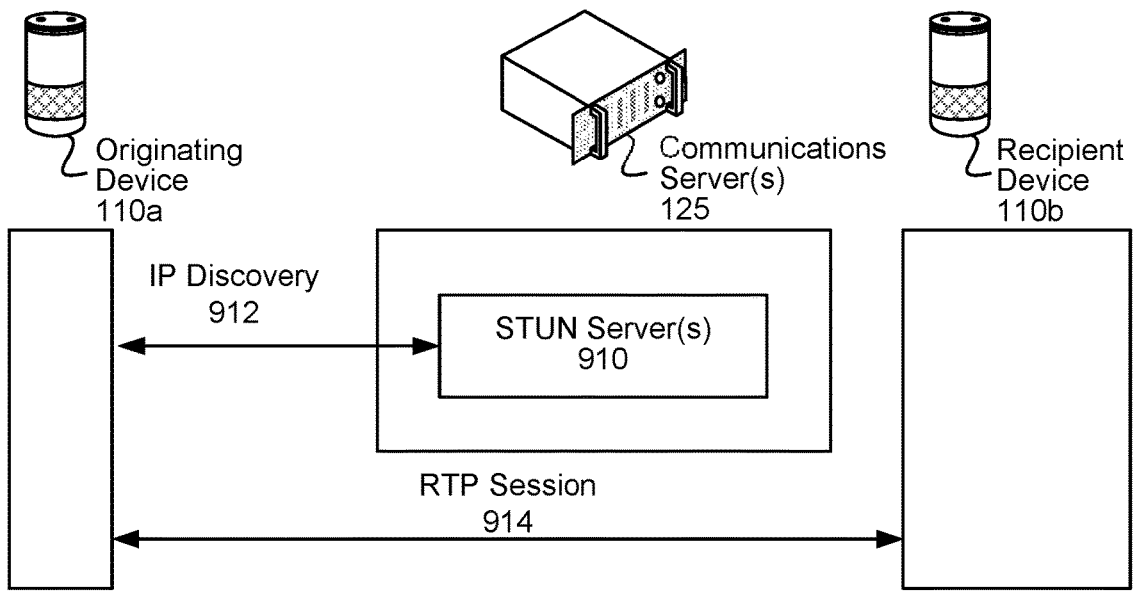
FIGS. 9A and 9B illustrate examples of establishing media connections between devices according to embodiments of the present disclosure.
Figure 9B:
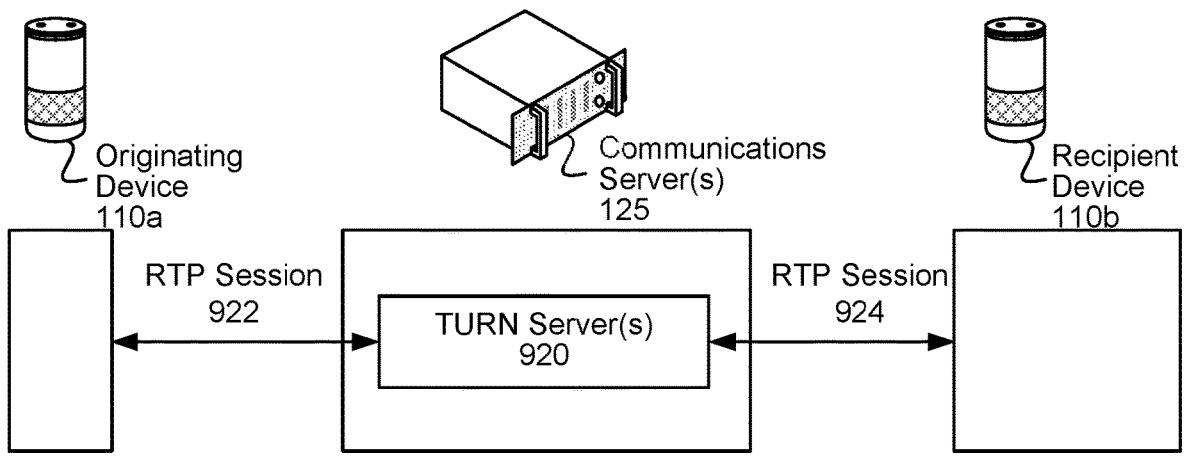

FIGS. 9A and 9B illustrate examples of establishing media connections between devices according to the present disclosure. In some examples, the originating device 110a may have a publicly accessible IP address and may be configured to establish the RTP communication session directly with the recipient device 110b. To enable the originating device 110a to establish the RTP communication session, the communications server(s) 125 may include Session Traversal of User Datagram Protocol (UDP) Through Network Address Translators (NATs) server(s) (e.g., STUN server(s) 910). The STUN server(s) 910 may be configured to allow NAT clients (e.g., an originating device 110a behind a firewall) to setup calls to a VoIP provider hosted outside of the local network by providing a public IP address, the type of NAT they are behind, and a port identifier associated by the NAT with a particular local port. As illustrated in FIG. 9A, the originating device 110a may perform (912) IP discovery using the STUN server(s) 910 and may use this information to set up an RTP communication session 914 (e.g., UDP communication) between the originating device 110a and the recipient device 110b to establish a call.

In some examples, the originating device 110a may not have a publicly accessible IP address. For example, in some types of NAT the originating device 110a cannot route outside of the local network. To enable the originating device 110a to establish an RTP communication session, the communications server(s) 125 may include Traversal Using relays around NAT (TURN) server(s) 920. The TURN server(s) 920 may be configured to connect the originating device 110a to the recipient device 110b when the originating device 110a is behind a NAT. As illustrated in FIG. 9B, the originating device 110a may establish (922) an RTP session with the TURN server(s) 920 and the TURN server(s) 920 may establish (924) an RTP session with the recipient device 110b. Thus, the originating device 110a may communicate with the recipient device 110b via the TURN server(s) 920. For example, the originating device 110a may send audio data to the communications server(s) 125 and the communications server(s) 125 may send the audio data to the recipient device 110b. Similarly, the recipient device 110b may send audio data to the communications server(s) 125 and the communications server(s) 125 may send the audio data to the originating device 110a.

In some examples, the system may establish communication sessions using a combination of the STUN server(s) 910 and the TURN server(s) 920. For example, a communication session may be more easily established/configured using the TURN server(s) 920, but may benefit from latency improvements using the STUN server(s) 910. Thus, the system may use the STUN server(s) 910 when the communication session may be routed directly between two devices and may use the TURN server(s) 920 for all other communication sessions. Additionally or alternatively, the system may use the STUN server(s) 910 and/or the TURN server(s) 920 selectively based on the communication session being established. For example, the system may use the STUN server(s) 910 when establishing a communication session between two devices (e.g., point-to-point) within a single network (e.g., corporate LAN and/or WLAN), but may use the TURN server(s) 920 when establishing a communication session between two devices on separate networks and/or three or more devices regardless of network(s). When the communication session goes from only two devices to three or more devices, the system may need to transition from the STUN server(s) 910 to the TURN server(s) 920. Thus, if the system anticipates three or more devices being included in the communication session, the communication session may be performed using the TURN server(s) 920. When the communication session goes from three or more devices to only two devices, the system may need to transition from the TURN server(s) 920 to the STUN server(s) 910.

The system may know when the communications speechlet 390a sends the device identifier(s) 512 and the text data 514 to the communications server(s) 125 for the purpose of establishing a communication session as described above. When a call is performed to provide an answer to the question, the system may be unable to determine the answer when the call is performed or shortly thereafter.

Figure 10:
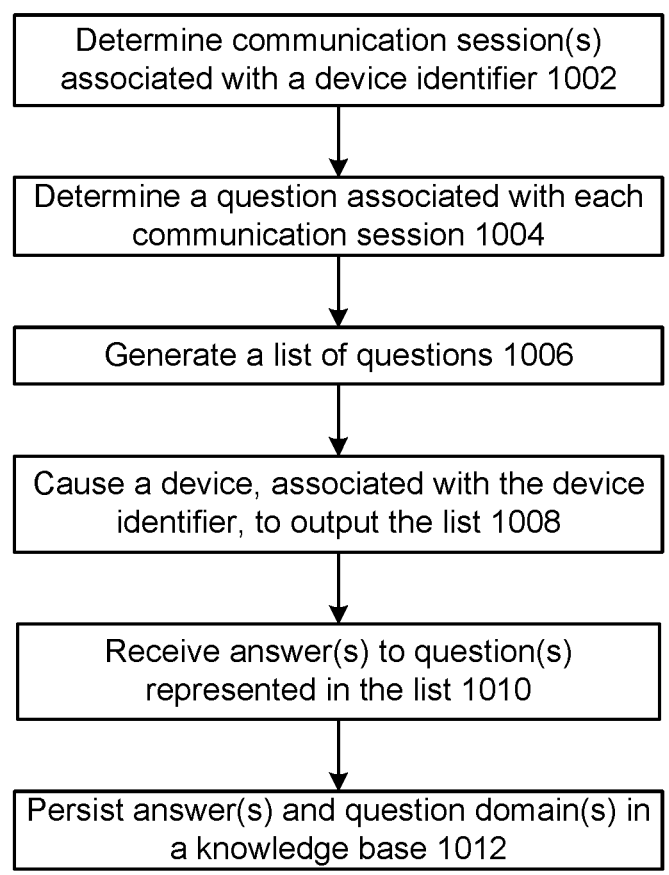
FIG. 10 is a process flow diagram illustrating how a system may populate a knowledge base with answers to user inputs originally answered using a communication session according to embodiments of the present disclosure.

FIG. 10 illustrates how the server(s) 120 may populate a user populated knowledge base 367 with answers to questions originally answered using one or more communication sessions. The server(s) 120 determines (1002) one or more communication sessions associated with a device identifier (e.g., of a device associated with a user specifically tagged as being able to contribute to a knowledge base 367, such as a concierge of a hotel). The determined communication sessions may relate to a previous period of time, such as a past day, a week, etc.

The server(s) 120 determines (1004) a question associated with each determined communication session(s). The server(s) 120 may determine text data (representing a user's question) that ultimately resulted in the communication server(s) 125 causing a communication session. For example, the server(s) 120 may determine a user input identifier associated with the communication session and may determine text data, associated with the user identifier, input to the user provided information query service 369. The server(s) 120 may perform these operations for each determined communication session associated with the device identifier.

The server(s) 120 may generate (1006) a list representing the questions. The server(s) 120 may determine questions that were asked a threshold number of times and may only include those questions in the list. This allows the system to obtain answers to questions that are likely relevant to multiple users. A list associated with a particular device identifier may be generated on a periodic basis, such as daily, weekly, etc.

The list may be embodied as text data and/or audio data. For example, the server(s) 120 may generate text data representing the questions and may perform TTS processing on the text data to generate audio data (e.g., synthesized speech) representing the list of questions.

The server(s) 120 may cause (1008) a device 110, associated with the device identifier, to output the list. The device 110 may display the list as text or output the list as audio. For example, the device 110 may display text and/or output audio corresponding to "here are the questions you received calls about today, do you want to provide answers so I can populate them in the knowledge base." The device 110 may provide functionality that enables a user of the device 110 to provide answers to one or more questions of the list using a keyboard or by speaking the answers. The server(s) 120 may cause the device 110 to output the list using an application that is implemented by the device 110 and that is specific to the establishment (e.g., hotel, rental property, etc.) with respect to which the questions were received; using email functionality of the device 110; or using some other functionality. The device 110 may be configured to enable the recipient of the list to determine how the recipient wants to receive the list. Thus, the device 110 may be configured to enable the recipient of the list to control the modality at which the list is output.

The server(s) 120 receives (1010) an answer(s) to a question(s) represented in the presented list and persists (1012) the answer(s) in the knowledge base associated with the question domain(s) answered. For example, if the question answered relates to a hotel, the answer and question may be stored in a knowledge base specific to the hotel. Once the answer is populated in the knowledge base, the system may use the answer to answer related questions in the future, thereby preventing the need to establish communication sessions in the future with respect to questions associated with the answer.

Once an answer to a question is populated in the knowledge base, the system may generate an indicator representing the question was answered. The system may associate the indicator with the corresponding communication session. This may prevent the system from determining the communication session at step 1002 in the future since the question of the communication session as already answered.

Figure 11:
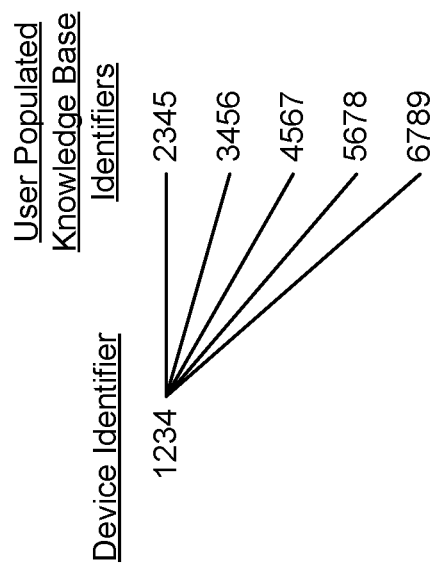
FIG. 11 is a conceptual diagram illustrating a device identifier associated with various user populated knowledge base identifiers according to embodiments of the present disclosure.

A given device may leverage multiple user populated knowledge bases 367 to determine an answer to a question. For example, a device 110 may be located at a rental property (or some other location). The device's identifier may be associated with various knowledge base identifiers, as illustrated in FIG. 11. For example, the device identifier may be associated with a knowledge base specific to the rental property (e.g., storing the rental property's Wi-Fi password, location of paper towels, management contact information, etc.). For further example, the device identifier may be associated with a knowledge base specific to the rental property's neighborhood (e.g., storing nearby restaurant information, police contact information, etc.). With permission, the system may include a knowledge base associated with past renters of the property. Such a knowledge base would enable a present renter to ask a question and enable the system to query past renters (whose user identifiers are associated with the knowledge base) for answers to the question. The answers may then be populated into the knowledge base. By associating a device identifier with multiple user populated knowledge base identifiers, the system is able to answer more questions specific to the device's surroundings than may otherwise be possible.

When a user stays at a temporary location (e.g., a hotel or rental property), the user may give the system permission to associate their user identifier with a device(s) 110 of the location. As a result, the system may associate the device's identifier with user populated knowledge base identifiers represented in the user's profile. This enables the user to obtain answers, from the system, to an increased number of questions that are specific to the user than may otherwise be possible. When the user is no longer staying at the temporary location, the system may cause the user's identifier (and corresponding knowledge base identifiers) to no longer be associated with the device identifier of the temporary location.

Figure 12:
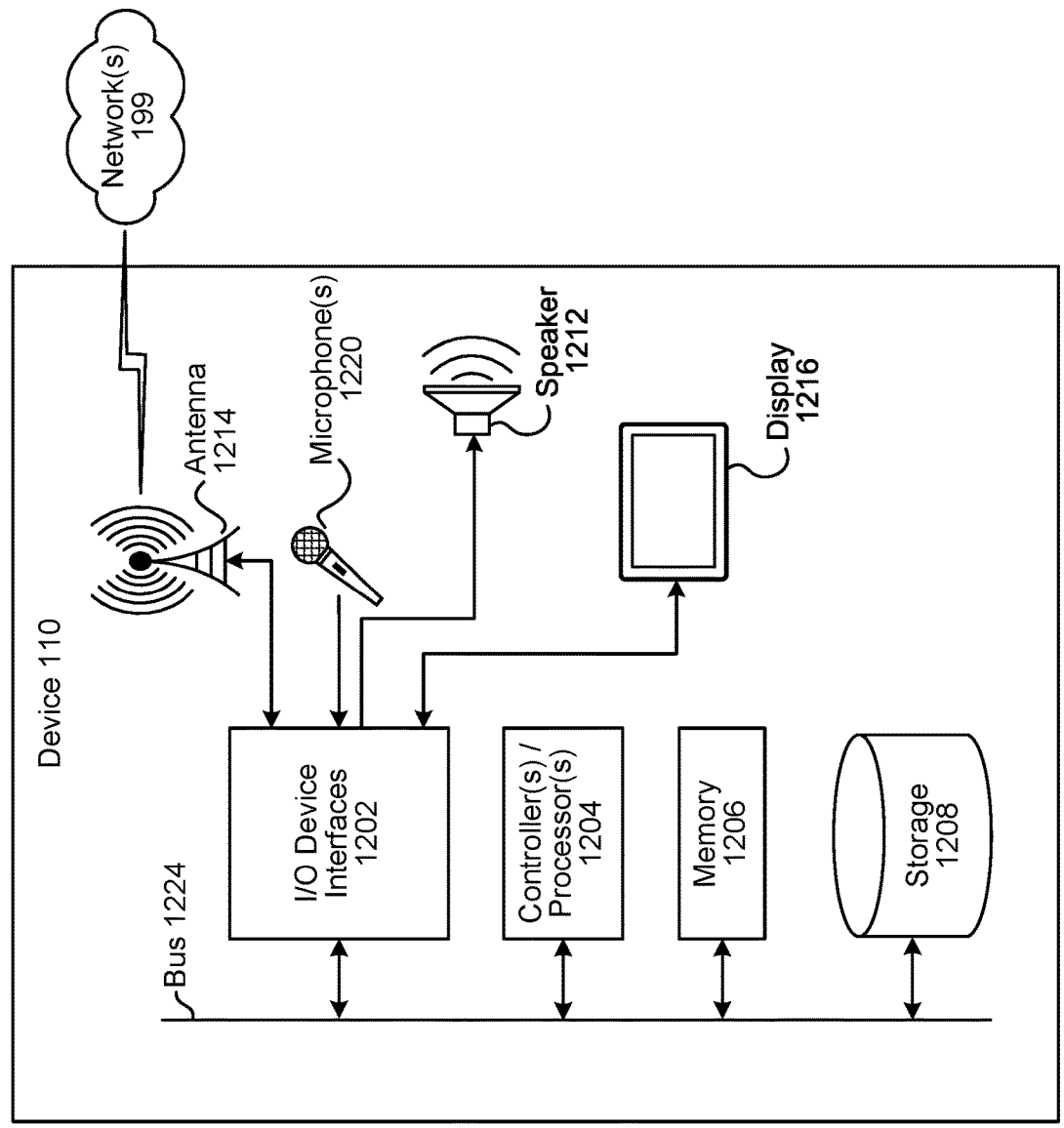
FIG. 12 is a block diagram conceptually illustrating example components of a device according to embodiments of the present disclosure.
Figure 13:
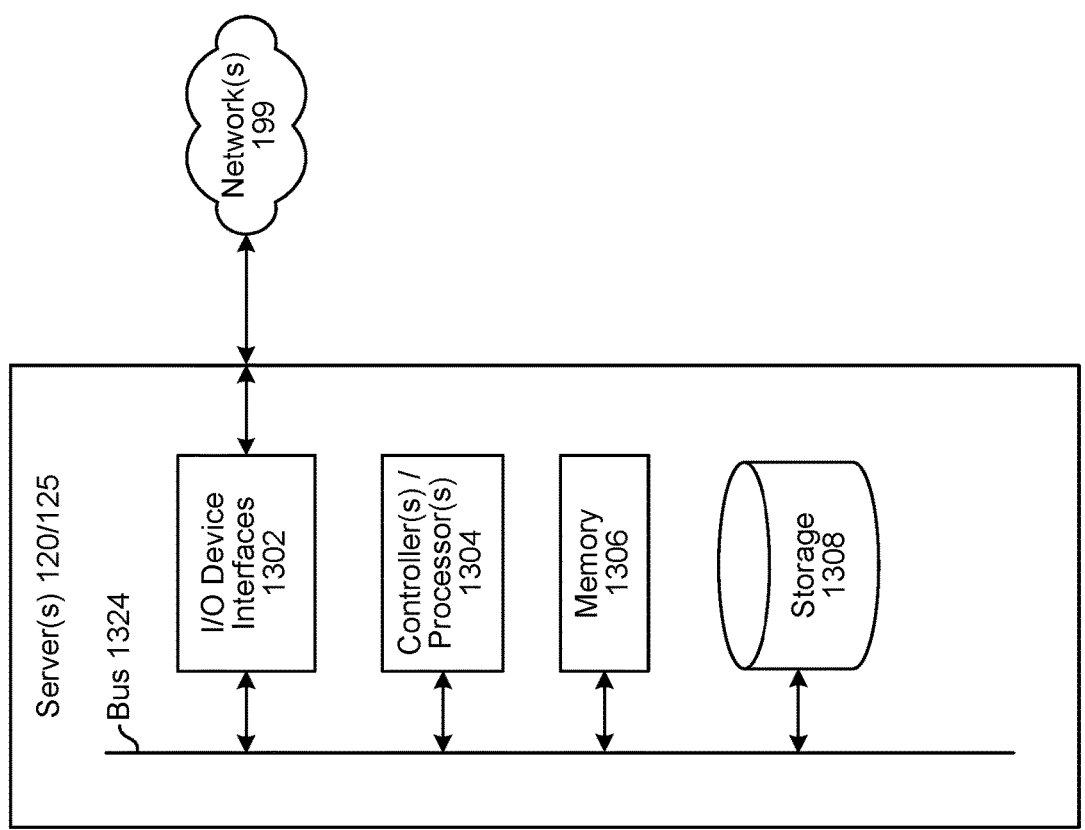
FIG. 13 is a block diagram conceptually illustrating example components of a server according to embodiments of the present disclosure.

FIG. 12 is a block diagram conceptually illustrating a device 110 that may be used with the system. FIG. 13 is a block diagram conceptually illustrating example components of a remote device, such as the server(s) 120, which may assist with ASR processing, NLU processing, etc., and the communications server(s) 125. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/125) may be included in the system, such as one or more servers 120 for performing ASR processing, one or more servers 120 for performing NLU processing, one or more communications server(s) 125 for sending messages and/or performing multi-endpoint communication sessions, etc. In operation, each of these devices (or groups of devices) may include computer-readable and computer-executable instructions that reside on the respective device (110/120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the server(s) 120, or the communications server(s) 125 may include their own dedicated processors, memory, and/or storage. Alternatively, one or more of the components of the device(s) 110, the server(s) 120, or the communications server(s) 125 may utilize the I/O interfaces (1202/1302), processor(s) (1204/1304), memory (1206/1306), and/or storage (1208/1308) of the device(s) 110 server(s) 120, or the communications server(s) 125, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the communications server(s) 125, as described herein, are illustrative, and may be located as a stand-alone device or may be included, in whole or in part, as a component of a larger device or system.

Figure 14:
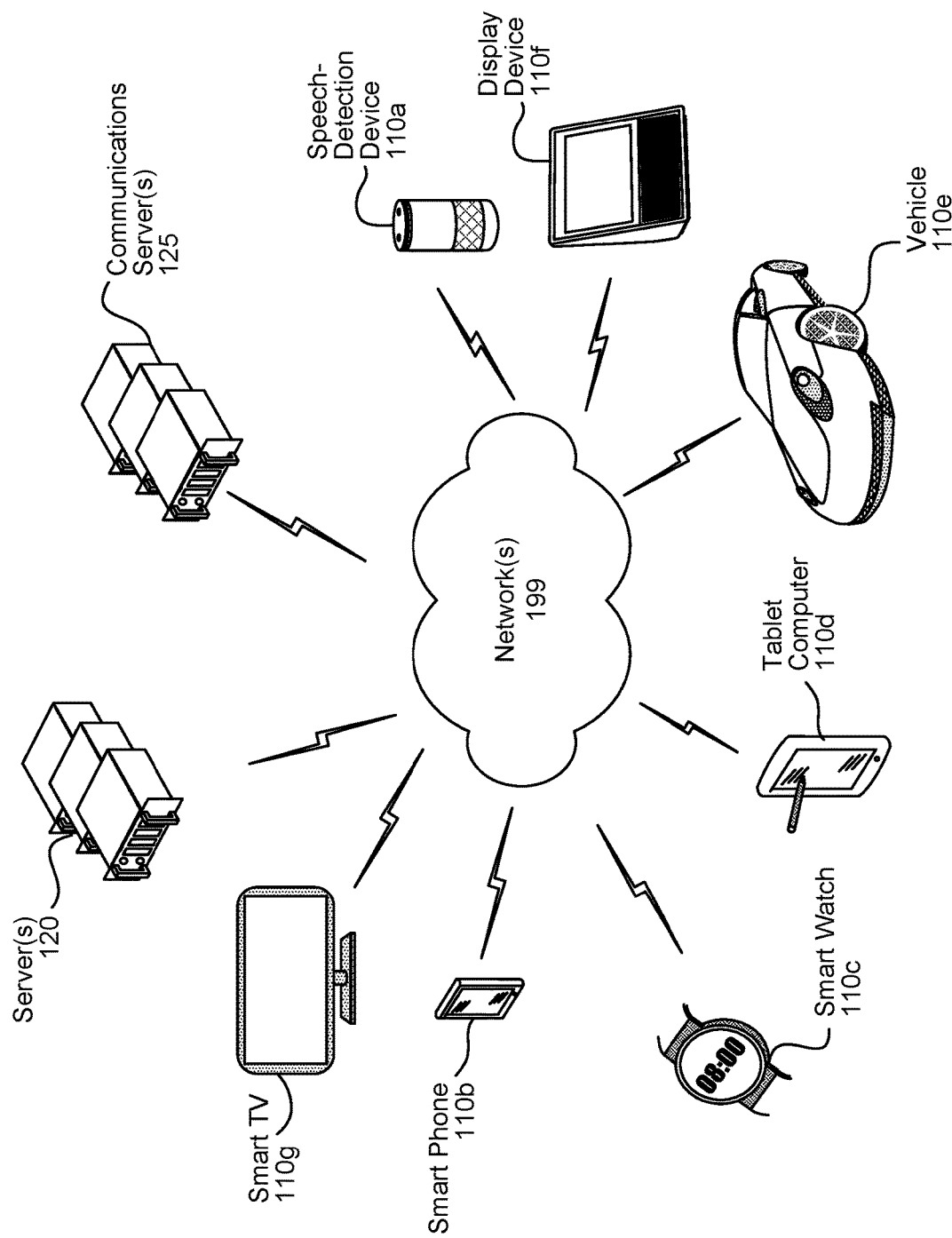
FIG. 14 illustrates an example of a computer network for use with the speech processing system.

As illustrated in FIG. 14, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the communications server(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving, from a first device, first user input data representing a first question;
   determining the first question relates to a knowledge base;
   determining the first question is unable to be answered using the knowledge base;
   determining a user identifier associated with the knowledge base;
   determining a second device associated with the user identifier;
   causing the second device to output the first question;
   receiving, from the second device, second user input data representing a first answer to the first question; and
   determining output data comprising a representation of the first answer.

2. The computer-implemented method of claim 1, further comprising:
   storing, in the knowledge base, a representation of the first answer.

3. The computer-implemented method of claim 2, further comprising:
   storing, in the knowledge base, an association between the representation of the first answer and a user associated with the user identifier.

4. The computer-implemented method of claim 1, further comprising:
   sending the output data to the first device; and
   causing the first device to present an output corresponding to the output data.

5. The computer-implemented method of claim 1, further comprising:
   performing speech synthesis using the output data to determine output audio data;
   sending the output audio data to the first device; and
   causing the first device to present output audio corresponding to the output audio data.

6. The computer-implemented method of claim 1, further comprising:
   determining a location of the first device; and
   determining the knowledge base based at least in part on the location.

7. The computer-implemented method of claim 1, further comprising:
   determining the first question relates to at least one question topic; and
   determining the knowledge base based at least in part on the at least one question topic.

8. The computer-implemented method of claim 1, further comprising:
  determining the first question relates to at least one question topic; and
  determining the user identifier based at least in part on the at least one question topic.

9. The computer-implemented method of claim 1, further comprising:
  causing a two-way communication session to be established between the first device and the second device.

10. The computer-implemented method of claim 1, wherein the second user input data comprises audio data and the method further comprises:
  performing speech processing on the audio data to determine speech processing results data; and
  determining a portion of the speech processing results data corresponds to the first answer to the first question.

11. A system comprising:
  at least one processor; and
  at least one memory comprising instructions that, when executed by the at least one processor, cause the system to:
    receive, from a first device, first user input data representing a first question;
    determine the first question relates to a knowledge base;
    determine the first question is unable to be answered using the knowledge base;
    determine a user identifier associated with the knowledge base;
    determine a second device associated with the user identifier;
    cause the second device to output the first question;
    receive, from the second device, second user input data representing a first answer to the first question; and
    determine output data comprising a representation of the first answer.

12. The system of claim 11, wherein the at least one memory further comprises instructions that, when executed by the at least one processor, further cause the system to:
  store, in the knowledge base, a representation of the first answer.

13. The system of claim 12, wherein the at least one memory further comprises instructions that, when executed by the at least one processor, further cause the system to:
  store, in the knowledge base, an association between the representation of the first answer and a user associated with the user identifier.

14. The system of claim 11, wherein the at least one memory further comprises instructions that, when executed by the at least one processor, further cause the system to:
  send the output data to the first device; and
  cause the first device to present an output corresponding to the output data.

15. The system of claim 11, wherein the at least one memory further comprises instructions that, when executed by the at least one processor, further cause the system to:
  perform speech synthesis using the output data to determine output audio data;
  send the output audio data to the first device; and
  cause the first device to present output audio corresponding to the output audio data.

16. The system of claim 11, wherein the at least one memory further comprises instructions that, when executed by the at least one processor, further cause the system to:
  determine a location of the first device; and
  determine the knowledge base based at least in part on the location.

17. The system of claim 11, wherein the at least one memory further comprises instructions that, when executed by the at least one processor, further cause the system to:
  determine the first question relates to at least one question topic; and
  determine the knowledge base based at least in part on the at least one question topic.

18. The system of claim 11, wherein the at least one memory further comprises instructions that, when executed by the at least one processor, further cause the system to:
  determine the first question relates to at least one question topic; and
  determine the user identifier based at least in part on the at least one question topic.

19. The system of claim 11, wherein the at least one memory further comprises instructions that, when executed by the at least one processor, further cause the system to:
  cause a two-way communication session to be established between the first device and the second device.

20. The system of claim 11, wherein the second user input data comprises audio data and wherein the at least one memory further comprises instructions that, when executed by the at least one processor, further cause the system to:
  perform speech processing on the audio data to determine speech processing results data; and
  determine a portion of the speech processing results data corresponds to the first answer to the first question.

* * * * *